United States Patent [19]

Inagaki

[11] Patent Number: 5,453,764
[45] Date of Patent: Sep. 26, 1995

[54] VIDEO EDITING APPARATUS

[75] Inventor: Tomoki Inagaki, Yamato, Japan

[73] Assignee: Matsushita Graphic Communication Systems, Inc., Tokyo, Japan

[21] Appl. No.: 935,112

[22] Filed: Aug. 27, 1992

[30] Foreign Application Priority Data

Aug. 28, 1991 [JP] Japan .................. 3-217491
Mar. 26, 1992 [JP] Japan .................. 4-067970

[51] Int. Cl.⁶ .................................. G09G 1/02
[52] U.S. Cl. ................ 345/201; 345/121; 345/126
[58] Field of Search ........................... 358/160, 183;
395/111, 133, 134, 138; 345/121-131, 189, 190, 201

[56] References Cited

U.S. PATENT DOCUMENTS

| 4,633,506 | 12/1986 | Kato ................. 345/189 X |
| 4,746,981 | 5/1988 | Nadan et al. ........... 358/183 X |
| 4,992,781 | 2/1991 | Iwasaki et al. ......... 358/183 X |
| 4,998,212 | 3/1991 | Dedien et al. .......... 345/189 X |

FOREIGN PATENT DOCUMENTS 62-186371  8/1987  Japan .
1145688    6/1989  Japan .
2288666   11/1990  Japan .
3180893    8/1991  Japan .................. 345/189

OTHER PUBLICATIONS

Gray, R. J., "Bit Map Architecture Realizes Raster Display Potential," Compute Des.(USA), vol. 19, No. 7, (Jul. 1980), pp. 111–117.

Mielke, B., *Integrated Computer Graphics*, West Publishing Co., N.Y.; 1991, p. 132.

*Primary Examiner*—Ulysses Weldon
*Attorney, Agent, or Firm*—Lowe, Price, LeBlanc & Becker

[57] ABSTRACT

In a video editing apparatus, picture-representing data are stored in an area of a RAM, with a section of the data being selected to be transferred to form a display picture. When a command is supplied for cutting-out a region of the display picture, to replace the cut-out region with other data, the corresponding data region of the RAM area is stored in memory. If the user subsequently designates that the original data of the cut-out region are to be temporarily replaced in the display picture, the position of the cut-out region is calculated with respect to the data region that is currently being selected from the RAM area, the position with respect to the display picture is thereby obtained, and the cut-out data region is then read out of memory and inserted into the display picture at the obtained position.

2 Claims, 14 Drawing Sheets

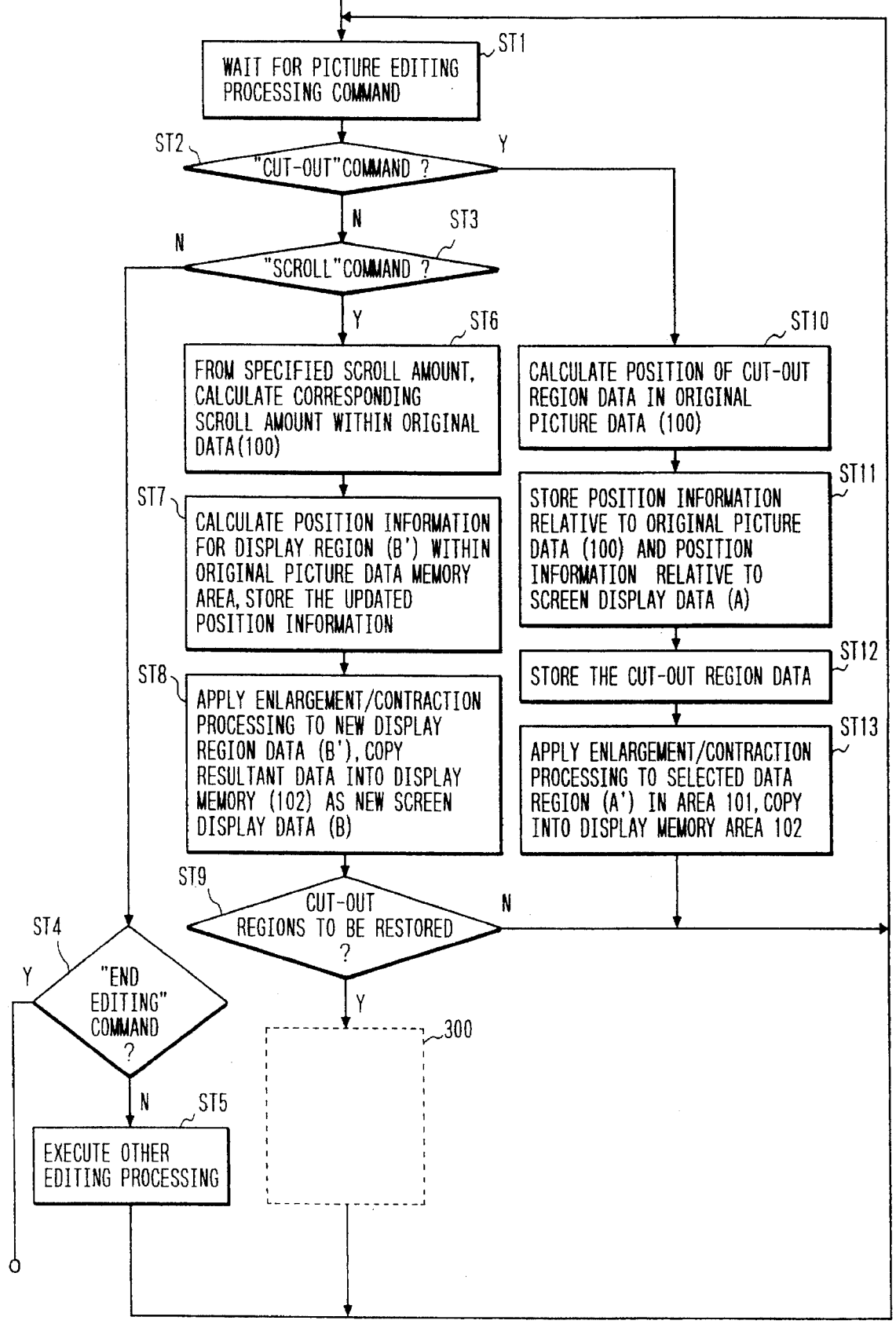

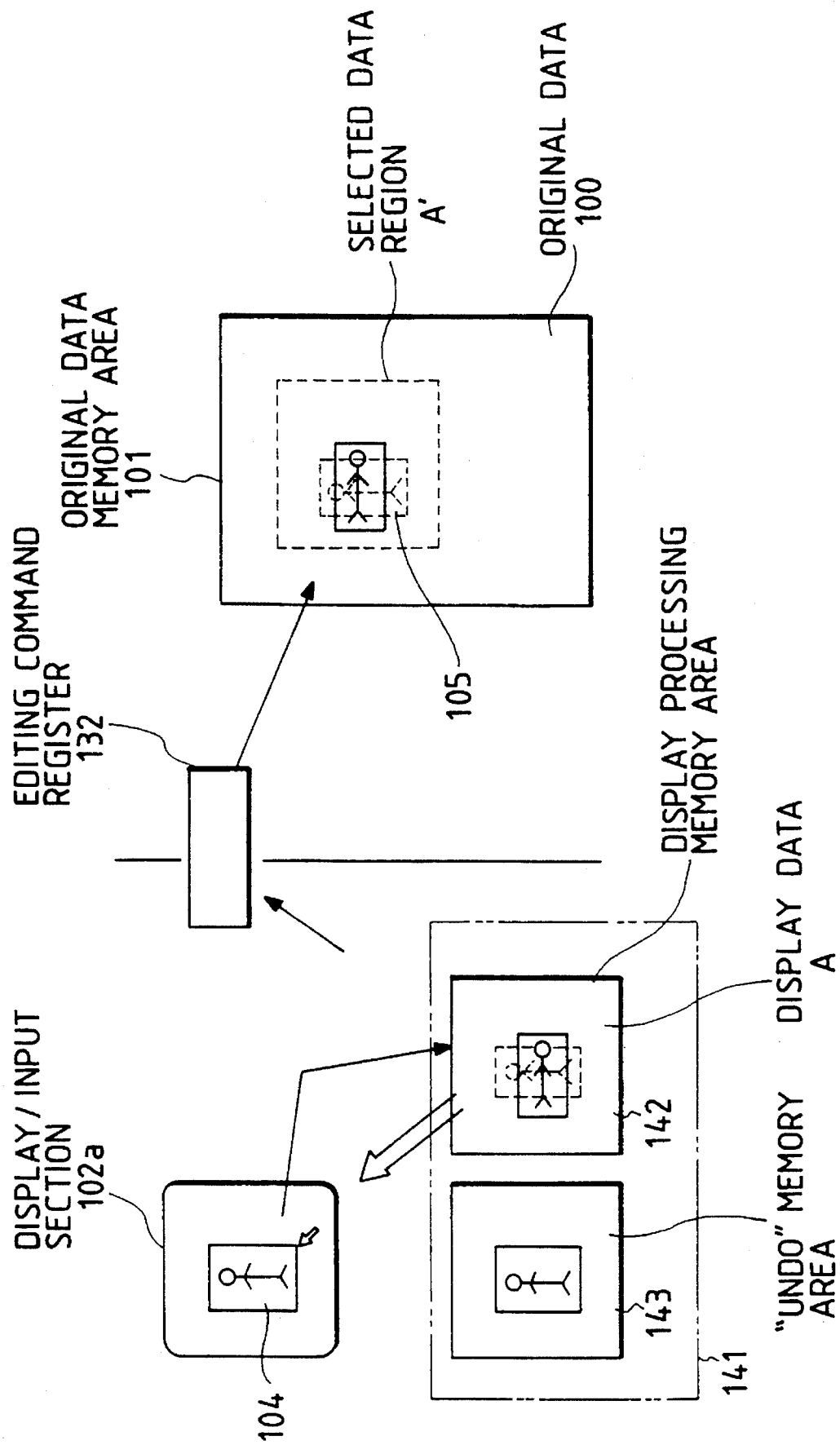

VIDEO EDITING APPARATUS

BACKGROUND OF THE INVENTION

1. Field of the Invention

The present invention relates to a video editing apparatus whereby a user can execute conversational-mode editing of a displayed picture which is generated from stored video data.

2. Description of the Related Art

With a prior art video editing apparatus, it is generally possible for the user to designate a region within a display picture produced by a display unit of the apparatus, and to then input a "cut-out" command to the video editing apparatus, whereby data corresponding to the designated region (such a region being referred to in the following as a cut-out region) are "cut-out" from the display picture, i.e. are replaced by predetermined other data. In the following, such other data will be referred to as the replacement data, for that cut-out region. It is possible that, after executing such an operation, the user may subsequently wish to move the cut-out data to another location in the display picture, or to re-insert the data which have been removed from a cut-out region. For that reason, in the prior art, the data which have been removed as a result of the cut-out operation (such data being referred to in the following as the cut-out region data) are stored, together with position information specifying the position of the cut-out region with respect to the display picture. Thus the user can thereafter control the video editing apparatus to either produce the display picture with the replacement data appearing in the cut-out region, or to read out the cut-out region data from memory and copy the cut-out region data into the appropriate position within a display memory area, to be displayed in its original position within the display picture. As used in the following, "display memory area" signifies a memory area whose contents are directly transferred to be displayed by a display unit, i.e. there is a direct correspondence between the stored data in the memory and the display contents, and the boundary of the memory area corresponds to the boundary of the display picture.

It will be assumed in the following that such cut-out regions are of rectangular shape, however other shapes are of course possible. In the case of a rectangular cut-out region, the position-specifying information which the user must input in order to designate a cut-out region data can for example consist of the coordinates of one corner of the region (e.g. the upper left-hand corner) and the height and width of the region. The user typically specifies each cut-out region by observing a cursor formed on the display, while using an input device such as a mouse and a keyboard to move the cursor.

However the following problems arise with such a prior art type of video editing apparatus. If display scrolling is executed after such a cut-out region data replacement/storage operation has been executed, then since the position of each cut-out region is defined with respect to the display picture prior to scrolling, that position information cannot be used to correctly locate each cut-out region in the new display picture. That problem is illustrated in FIG. 1, in which numeral 200 can be considered as representing a display picture produced by a display unit, or the contents of a display memory area whose contents are directly displayed by the display unit. Within the display picture 200, two cut-out regions designated as "a" and "b" have been formed, with replacement data for each of these appearing in the display picture (e.g. "all white" data values). If display scrolling in the downward direction is now executed, then the contents of the display picture will appear to be moved upward, as shown by display picture 201. However the two cut-out regions "a" and "b" will remain in the same positions on the screen (since their respective positions are fixedly specified with respect to boundaries of the display picture. Hence the cut-out regions will be in incorrect relative positions to the remainder of the display picture contents, after scrolling is performed, i.e. the cut-out regions have not been scrolled together with the remainder of the picture. Thus it will be necessary for the user to again designate position information for the cut-out regions and input "cut-out" commands, and the video editing apparatus then has to again write the replacement data into the corresponding positions in the display memory area.

Furthermore, after scrolling has been executed, it may be necessary to read out the replacement data from a storage medium such as a hard disk, to be copied into the appropriate new positions in the display memory area, to appear on the display at the correct position. However if there are a large number of cut-out regions formed, then a substantial amount of time is required for executing such operations, each time that display scrolling is executed. Thus, it has been difficult to achieve a sufficiently high speed of scrolling in such a case. This problem is especially severe in the case of applications in which it is necessary to have a capability for scrolling very rapidly, while being able to make sudden changes in the scrolling speed.

In FIG. 1, 202 denotes a display picture produced by enlargement of the display picture 200 (by the operation of a display enlargement/contraction section of a video editing apparatus, as described hereinafter). In this case too, the relative positions of the cut-out regions to the other contents of the display picture will be incorrect, after the display enlargement processing, while in addition the sizes of the cut-out regions will be incorrect.

Another problem of prior art types of video editing apparatus will be described referring to the data flow diagram of FIG. 2 and processing flow diagram of FIG. 3. In FIG. 2, 401 denotes a display picture produced by a display unit. Numeral 402 denotes a display memory area whose contents correspond directly to the contents of the display picture. 403 denotes an original data memory area, whose contents can be changed by display editing commands generated by the user. A selected data region 406 within the original picture data memory area 403 is copied into the display data memory area 402. Numeral 404 denotes a memory area referred to as an "UNDO" memory area, whose function will be described in the following and which is equal in size to the original picture data memory area 403. 407 denotes a region within the display picture 401 which it will be assumed that the user is to change by display editing, from the previous contents consisting of a vertical "stick figure", to a horizontal figure as indicated, i.e. by rotation of the region 401 by 180°. The operation will be described referring to FIG. 3. In step ST1, the user is performing various display processing operations, such as commands for moving a cursor or for executing display editing, by operating a mouse and keyboard for example. If it is detected in step ST2 that an editing processing command (or an "undo" command as described in the following) has been supplied, then the contents of the command are temporarily set into a register (step ST2), then in step ST4 a decision is made as to whether or not the command held in the register is an "undo" command, i.e. a command which specifies that the effects of the most recent editing processing command are to be eliminated. If it is found that the command is not an "undo" command but is a display editing processing command, then in step ST5 the entire contents of the original picture data memory area 403 are copied into the UNDO memory area 404. The display editing processing command contents are then read out from the register (step ST6), and are applied to the contents of the original picture data memory area 403, i.e. within the selected data region 406 in the original picture data memory area 403. Thus for example the contents of the region 408 are changed as shown from data representing the vertical stick figure to data representing the horizontal stick figure. The contents of the selected data region 406 in the memory area 403 are then copied into the display data memory area 402 (step ST7) so that the results of the editing processing will now appear on the display picture 401, i.e. the vertical stick figure in the region 407 of the display picture will be changed to a horizontal figure.

If however it is found in step ST4 that an "undo" command has been supplied, then the entire contents of the UNDO memory area 404 are copied into the original picture data memory area 403 (step ST6). Step ST7 is then executed, and as a result, the effects of the most recent display editing processing command will be eliminated from the display picture 401.

However such a system has two basic disadvantages. Firstly, when the user inputs a display editing processing command, then the system first has to copy the entire contents of the original picture data memory area 403 into the UNDO memory area 404, then perform the editing processing calculations and accordingly alter the contents of the original picture data memory area 403, then copy the selected data region from the original picture data memory area 403 into the display data memory area 402, to be transferred to the display unit and displayed. Thus, a substantial amount of time is required between the inputting of a display editing processing command and the appearance of the resultant display picture, i.e. there is a slow response to a display editing input operation that is executed by the user.

Secondly, since the memory capacity of the UNDO memory area 404 must be the same as that of the original picture data memory area 403, the overall amount of memory capacity required in the system is excessive. For example, assuming that the display size corresponds to an A3 size document sheet, and that the picture element density is 200 DPI (dots per inch), then a total memory capacity of approximately 4 megabytes will be necessary.

SUMMARY OF THE INVENTION

It is an objective of the present invention to overcome the problems described above, by providing a video editing apparatus whereby cut-out regions which are specified on a displayed picture will automatically follow any changes in the displayed picture which occur as a result of scrolling, enlargement, contraction, or rotation of the display picture.

It is a further objective of the present invention to provide a video editing apparatus whereby display scrolling or enlargement or contraction can be executed at high speed, even when operating in a condition in which original data of one or more cut-out regions in the display picture are temporarily restored to their original positions in the display picture in place of replacement data for each cut-out region, and in which the replacement data can be immediately re-inserted in each cut-out region without the need for the user to re-define the positions of the cut-out regions.

It is a further objective of the present invention to provide a video editing apparatus having a capability whereby the user can cancel the effects of a previously inputted display editing command, and whereby such cancellation can be rapidly executed, and moreover whereby it becomes unnecessary to provide a substantially increased amount of random access memory capacity in the video editing apparatus in order to implement such a cancellation capability.

More specifically, according to a first aspect the present invention provides a video editing apparatus comprising:

video display means;

a first memory area formed in a random access memory, for storing picture data that are to be edited;

a display memory area formed in a random access memory, for storing display data which are produced as a display picture by said display data;

a second memory area formed in a random access memory, for storing data regions extracted from said first memory area;

table memory means for storing position information including information specifiying a position of at least one cut-out region within said first random access memory area; and control means for copying a selected data region within said first memory area into said display memory area, after converting said selected data region to become identical in size to said said display memory area, and responsive to an input command specifying position information of a cut-out region with respect to said display picture for successively:

converting said position and dimension information to corresponding position and dimension information for said cut-out region with respect to said first memory area, storing said corresponding position information in said table memory means, copying cut-out region data, selected in accordance with said corresponding position and dimension information, from said selected data region in said first memory area into said second memory area, writing predetermined replacement data into said cut-out region in said first memory area, and copying said selected data region from said first memory area into said display memory area, after converting said selected data region to become identical in size to said said display memory area.

According to a second aspect, in such a video editing apparatus, said control means is responsive to a command designating that said display picture is to be scrolled by a specific scroll amount for:

calculating from said scroll amount a corresponding scroll amount with respect to said first memory area;

calculating, from said scroll amount with respect to the first memory area, position and dimension information for a new selected data region within said first memory area; and copying said new selected data region into said display memory area, after converting said selected data region to become identical in size to said said display memory area.

According to a third aspect, the video apparatus according to the first aspect is operable in a mode in which said original data of said cut-out region within said display picture are temporarily restored to said cut-out region, and wherein during operation in said mode said control means is responsive to a command designating that said display picture is to be scrolled by a specific scroll amount for:

calculating from said scroll amount a corresponding scroll amount with respect to said first memory area;

calculating, from said scroll amount with respect to the first memory area, position information for a new selected data region within said first memory area; and copying said new selected data region into said display memory area, after converting said selected data region to become identical in size to said said display memory area;

calculating, in accordance with position information stored in said table memory means, position information for said cut-out region with respect to said new selected data region within said first memory area, and based on calculation results obtained thereby, calculating position information for said cut-out region with respect to said display memory area; and copying said cut-out region data from said second memory area into said display memory area.

According to a fourth aspect, a video processing apparatus in accordance with the first aspect further comprises a third memory area formed in a random access memory, wherein said original picture data held in said first memory area are copied into said third memory area prior to forming said cut-out region in said first memory area, wherein said video editing apparatus is operable in a mode in which said original data of said cut-out region within said display picture are temporarily restored to said cut-out region, and wherein during operation in said mode said control means copies a selected data region from said third memory area into said display memory area after converting said selected data region to become identical in size to said said display memory area, and wherein said control means is responsive to a command designating that said display picture is to be scrolled by a specific scroll amount, during operation in said mode, for:

calculating from said scroll amount a corresponding scroll amount with respect to said third memory area;

calculating, from said scroll amount with respect to the third memory area, position information for a new selected data region within said third memory area; and copying said new selected data region into said display memory area, after converting said new selected data region to become identical in size to said said display memory area.

According to a fifth aspect, the present invention provides a video editing apparatus comprising:

first memory means for storing picture data that are to be edited;

second memory means having stored therein a portion of said picture data from said first memory means, and display means responsive to picture data stored in said second memory means for producing a display picture represented by said picture data;

third memory means;

editing command register means; and control means responsive to commands inputted to said video editing apparatus;

wherein said control means functions:

(a) in response to a display editing command specified with respect to data positions in said second memory area, by copying all data held in said second memory area into said third memory area, executing editing of the data held in said second memory area in accordance with contents of said display editing command, calculating contents for a display editing command specified with respect to data positions in said first memory area, and storing said contents in said editing command register means;

(b) in response to a command designating cancellation of a previously inputted display editing command, by copying all data held in said third memory area into said second memory area, and deleting from said editing command register means a display editing command which was most recently stored therein; and (c) in response to a command designating that changes are to be made in data held in said first memory area in correspondence with editing changes made in data held in said second memory area, by executing each of successive display editing commands held in said display editing command.

With the first aspect of the present invention as set out hereinabove, since the position of each cut-out region which is defined by the user with respect to a currently displayed picture is fixedly defined with respect to an original picture data memory area within a high-speed random access memory, and since operations such as scrolling or display enlargement or contraction are executed by selecting successively different data regions within that original picture data memory area and transferring the selected data region to be displayed after being converted to the appropriate size, the respective positions and dimensions of cut-out regions within the display picture will automatically follow any changes in the picture which are produced by scrolling or enlargement or contraction of the picture. Thus, the displayed cut-out regions will always be in a correct relationship with the contents of the display picture.

BRIEF DESCRIPTION OF THE DRAWINGS

FIGS. 5A, 5B constitute a processing flow diagram of the operation of the first embodiment;

FIG. 11 is a simple data flow diagram for a fourth embodiment; and

DESCRIPTION OF PREFERRED EMBODIMENTS

Figure 4:
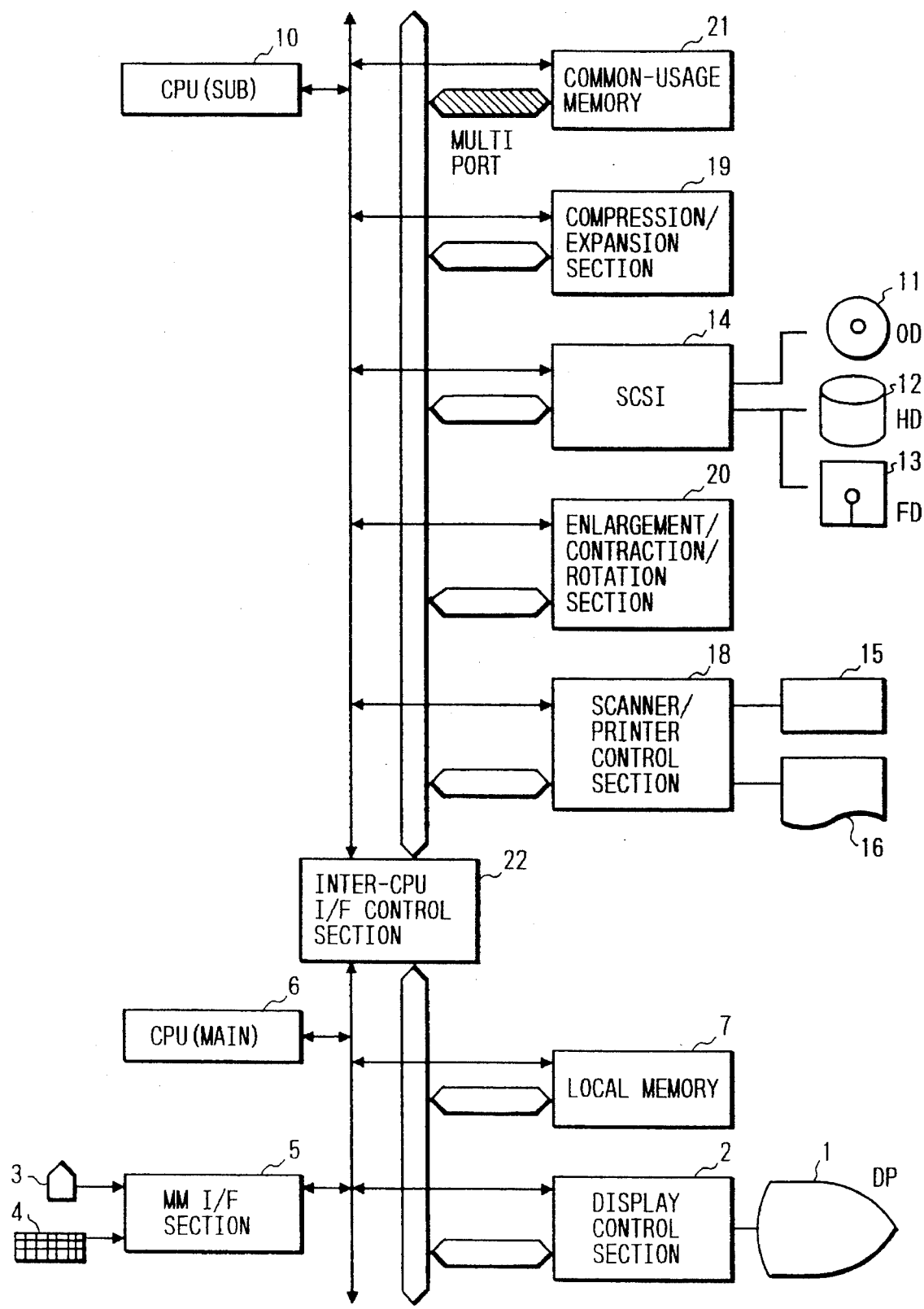
FIG. 4 is a block diagram showing a general system configuration which is applicable to each of respective described embodiments of a video editing apparatus according to the present invention.

FIG. 4 is a block diagram showing a general system configuration which is applicable to a video editing apparatus according to the present invention. In FIG. 4, numeral 1 denotes a display unit, whose operation is controlled by a display control section 2. A user can input commands and data to the system by using a mouse 3 and a keyboard 4, whose inputs are transferred via a man-machine interface section 5. The overall system operation, and interaction between the display unit 1, the mouse 3 and the keyboard 4, are controlled by a main CPU 6. A local memory 7 which is preferably a high-speed RAM, provides a display memory in which are stored the data that are displayed by the display unit 1.

Numeral 21 denotes a common-usage memory, preferably a high-speed RAM, which provides a memory area for use in executing video processing such as scrolling or enlargement or contraction processing, and also a memory area for storing cut-out region data. A sub CPU 10 functions mainly to handle video processing, operating on video data that are stored in an area of the common memory 21. These data directly represent a large-scale "picture", i.e. in memory-mapped form, from which a region can be selected to be copied into a display memory area within the local memory 7, to be displayed as a picture by the display unit 1. The system also can include such auxiliary storage devices as an optical disk unit 11, a hard disk unit 12, and a floppy disk unit 13, which are controlled by an interface control section 14. 15 and 16 denote a scanner and printer, respectively, each controlled by an interface control section 18. A data compression/expansion section 19 executes any necessary compression or expansion coding/decoding of data, e.g data that are to be transferred to/from an auxiliarly storage device. An enlargement/contraction/rotation section 20 can execute processing of data selected from the aforementioned region of the memory area in the common memory 21 before these data are transferred to be displayed, to thereby produce enlargement, contraction or rotation of the picture that is displayed by the display unit 1.

Communication between the CPUs 6 and 10 is controlled by an inter-CPU interface control section 22.

The basic features of a first embodiment of the present invention will be described referring to the data flow diagram of FIG. 6. Prior to beginning display editing, a original picture data memory area 101 is reserved within the common memory 21, and video data 100 that are to be edited (referred to in the following as the original picture data) are transferred from a data source into the common memory 21 to be stored in the original picture data memory area 101. The video data 100 may for example have for example been read out from an auxiliary storage device such as the hard disk unit 12, then subjected to any necessary compression/ expansion processing by the expansion/compression section 19, or may have been directly supplied from the scanner 15. The video data that are thus stored in respective addresses of the original picture data memory area 101 correspond directly to a large "picture" (i.e. with each picture element being represented by a digital sample value or a set of mutually adjacent digital sample values). Thus, the term "memory region" (within the area 101) has effectively the same significance as "data region" within the data stored in that memory area. A section of the data 100 (referred to in the following as the selected data region) is selected to be produced as a display picture by the display unit 1. A cut-out region data memory area 103 is also reserved in the common memory 21, for storing data that are read out from "cut-out" regions in the original picture data 100, when the user inputs a command designating such a cut-out operation. Such a command includes position information for the cut-out region, specified with respect to the display picture produced by the display unit 1. The cut-out region data of three of these regions, specified with respect to the original picture data 100, are designated as a', b', and c' respectively in FIG. 6.

A display data memory area 102 is reserved in the local memory 7, for storing video data that are to be displayed by the display unit 1. That is to say, the contents of the data stored in the display data memory area 102 directly correspond to the contents of the display picture produced by the display unit 1, i.e. each data region within the display data memory area 102 corresponding directly to a corresponding region of the picture displayed by the display unit 1.

Memory area for a position management table 104 is also reserved in the common memory 21, for storing position information relating to the cut-out regions. In this example it is assumed that all cut-out regions are of rectangular shape, and that the position of a cut-out region within a memory area is expressed by the coordinates of the upper left-hand corner and the height and width dimensions of the cut-out region.

The basic features of video editing operation with this embodiment are as follows. It will first be assumed that the system is operating with the a selected data region A' (shown as a broken-line rectangle) within the original picture data 100 in the original picture data memory area 101 having been selected to be displayed, with no cut-out regions appearing in the display. In that case, the selected data region A' is first subjected to an appropriate amount of enlargement or contraction processing by the enlargement/contraction/rotation section 20, to be converted to data that will exactly fill the display data memory area 102, and so will exactly fill the display area of the display unit 1. If the user inputs a display editing command which specifies that a cut-out region of a specific size is to appear at a specific position in the display picture (e.g. by using the mouse 3 to point to the required positions of two opposing corners of the cut-out region), then the main CPU 6 transfers the command contents via the inter-CPU interface section 22 to the sub CPU 10. The sub CPU 10 stores the transferred position information, which is position information with respect to the display picture (i.e. relative to the display data memory area 102) in the position management table 104. For example in the case of the cut-out region "a" the coordinates $da_x$, $da_y$ and horizontal and vertical dimensions $da_w$, $da_h$ are transferred to the sub CPU 10 and stored in the position management table 104. The sub CPU 10 then calculates the corresponding position and dimensions of the cut-out region within the original picture data memory area 101 (e.g. as the coordinates $da'_x$, $da'_y$ and horizontal and vertical dimensions $da'_w$, $da'_h$, which specifies the corresponding cut-out region indicated as a' in the original picture data memory area 101, and also stores that position information in the position management table 104. The sub CPU 10 then copies the cut-out region data a' into an arbitrary position in the cut-out region memory area 103, and writes into the replacement data into the cut-out region region corresponding to a' within the original picture data memory area 101, i.e. writes into that cut-out region the data that are to replace the cut-out region data in the display picture, such as data to produce a blank white region in the display. Such data will be referred to in the following as replacement data.

The selected data region A' is then copied from the original picture data memory area 101 (after being subjected to the necessary degree of enlargement or contraction processing) into the display data memory area 102, as the display data A. A display picture is thereby produced in which the cut-out command that was inputted by the user has been executed, for example to convert the cut-out region "a" in the display picture to an all-white region. Be executing such cut-out operations in succession, the three cut-out regions "a", "b" and "c" have been produced in the display data A in the example of FIG. 6.

Figure 7:
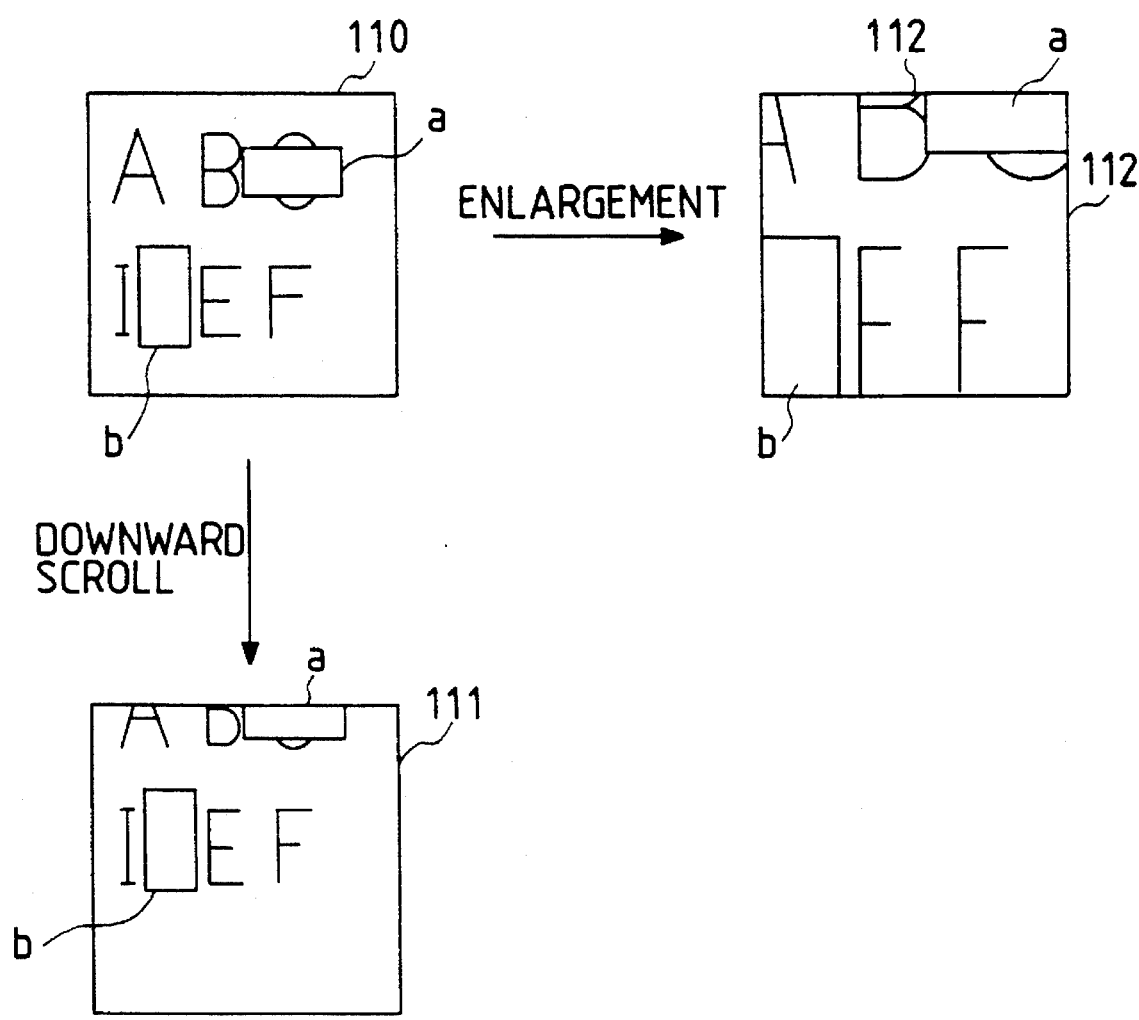
FIG. 7 illustrates changes resulting from display scrolling and enlargement or contraction, in a display picture which includes cut-out regions, for the case of a video editing apparatus according to the present invention.

Thereafter, if the user inputs a command which causes a different part of the original picture data 100 to be selected to be copied into the display data memory area 102 (i.e. a scroll command, or a display enlargement or contraction command), then when that new selected data region of the original picture data memory area 101 is thus copied into the display data memory area 102, each of the cut-out regions will appear in the correct relative position within the display picture. This results from the fact that the cut-out regions are fixed in position, relative to the original picture data 100 within the original picture data memory area 101, so that the cut-out regions appearing in the display picture produced by the display unit 1 will accurately follow any changes in that display picture that result from execution of scrolling or display enlargement or contraction commands. That is illustrated in FIG. 7, in which for example as a result of downward scrolling (i.e. with the selected data region in the original picture data 100 being moved downward by a specific amount), the cut-out regions "a" and "b" within the display picture 110 are moved upward in the display picture together with the rest of the picture contents, and remaining in the correct positions with respect to the rest of the picture contents in the resultant display picture 111. Similarly when display enlargement is executed (i.e. a smaller size of selected data region is copied from the original picture data 100 into the display data memory area 102, after enlargement processing) the cut-out regions are both shifted and enlarged such as to be correct in position and size with respect to the remainder of the picture contents in the resultant display picture 112.

Thereafter, if required, the cut-out region data for any of the cut-out regions can be read out from memory area 103 and subjected to the same degree of enlargement or contraction processing that was applied to the data of the region A', and the resultant cut-out region data can be copied into the display data memory area 102 at the position specified by the position information with respect to the display data memory area. The cut-out region is thereby restored in the display picture.

Thus a basic advantage of this embodiment results from the fact that the cut-out region data are stored in the cut-out region memory 103, and that position information for each of the cut-out regions with respect to the display data memory area 102 and with respect to the original picture data memory area 101 are stored in the position management table 104. That is to say, if the user wishes at any time to restore any of the cut-out region data to its original position in the display picture contents, that can be immediately done, without affecting the replacement data which have been stored in the cut-out region positions within the original picture data memory area 101. Furthermore, even if scrolling or display enlargement or contraction is executed while such a condition has been established (in which cut-out region data have been temporarily restored to their original position in the display picture), the restored cut-out region data will accurately follow the changes in the display picture. Thus the user can freely change between a condition in which the replacement data appear on the display and a condition in which one or more cut-out regions are restored to their original display condition, and can freely execute scrolling or display enlargement or contraction while either of these conditions is established.

In the following, to simplify the diagrams and descriptions, it will be assumed in each case that the user specifies that the original data of each cut-out region are to be present in the display picture, before and after a scrolling or enlargement or contraction operation. However it will be understood that in fact the user can input commands to select either display of the replacement data or the cut-out region data, in the cut-out regions of the display picture.

For simplicity, the operation during scrolling will first be described for the case of the single cut-out region "a" of FIG. 6 having been established. If the user inputs a "scroll" command, for example a command designating that the display picture is to be scrolled leftward by the amount $h_w$ indicated in FIG. 6, then the command contents are transferred by the main CPU 6 to the sub CPU 10, and the program of the sub CPU 10 then executes a processing sequence which is basically as follows, assuming that any cut-out regions which have been previously established are to be restored within the display picture.

(a) Firstly, the scroll amount $h_w$ is converted into the equivalent scroll amount with respect to the original picture data 100 in the original picture data memory area 101, and from that, the position is determined for a new selected data region (designated as B' in FIG. 6) within the original picture data 100, which is to be transferred to be displayed. After the aforementioned degree of enlargement or contraction has been applied to the data of the region B', the resultant data are copied into the display data memory area 102, as the new display data (B).

(b) Secondly, based on the position information that has been derived for the new data region B' within the original picture data 100, and the previously stored position information for the cut-out region data a' within the original picture data memory area 101 (held in the position management table 104), the position of the cut-out region data a' with respect to the new data region B' is calculated.

(c) Thirdly, the corresponding position information for the cut-out region within the display data memory area 102 is calculated (i.e. in accordance with the aforementioned degree of enlargement or contraction which is applied to data transferred from the original picture data memory area 101 to the display data memory area 102). The cut-out region data a' are then copied from the cut-out region data memory area 103 into the display data B in the display data memory area 102, at the calculated position, after applying the same degree of enlargement or contraction as was applied to the region B'. Thus, the original data of the cut-out region "a" are restored to the display picture, at the correct position. That is to say the restored cut-out region has been, in effect, scrolled leftward integrally with the other contents of the display picture.

If there are a plurality of cut-out regions which will remain within the display picture after scrolling is executed, then the above sequence of operations is successively executed for each of these cut-out regions.

Figure 5B:
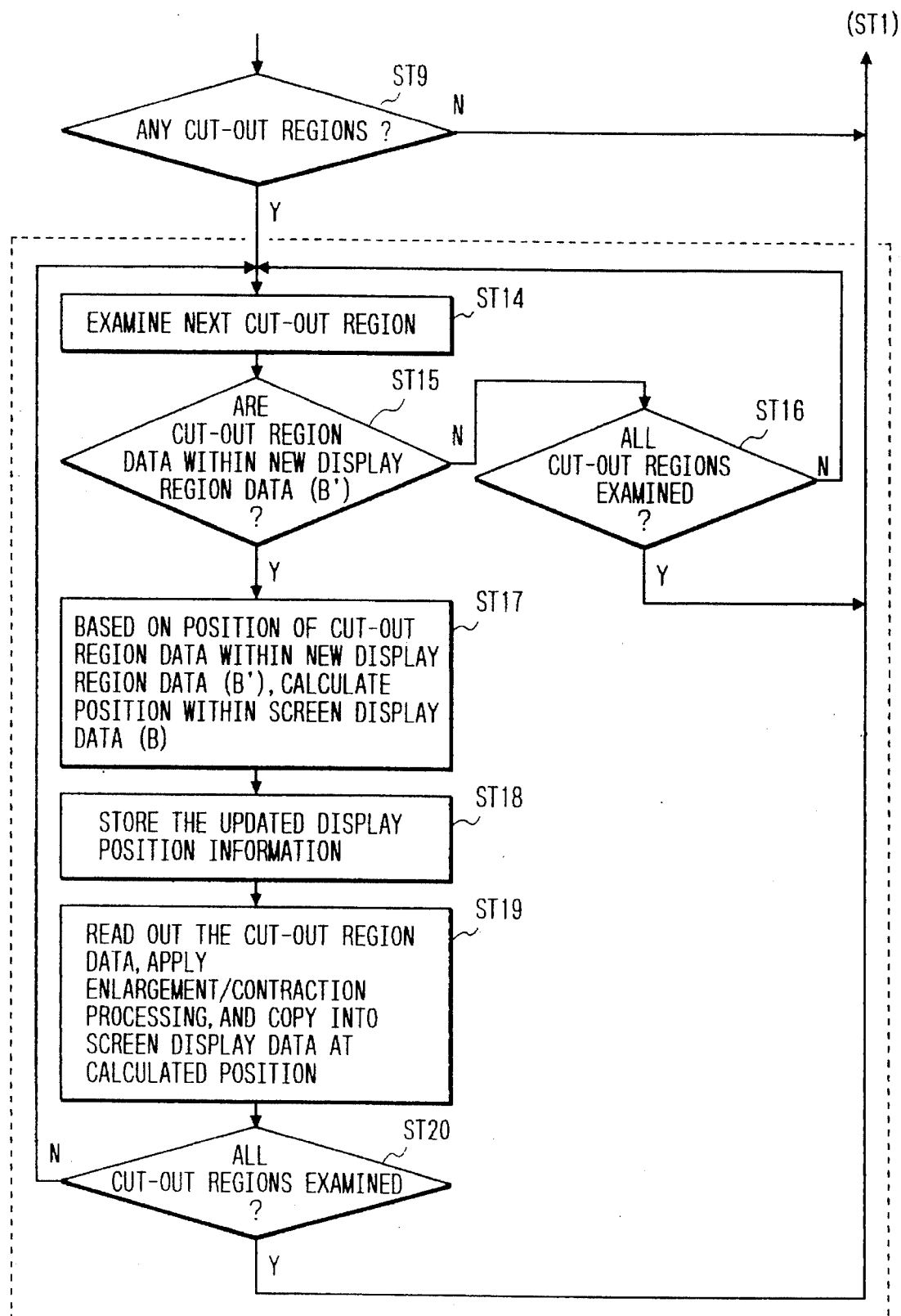

A more detailed description of the operation of this embodiment will be described referring again to FIG. 6, in conjunction with the processing flow diagram constituted by FIGS. 5A, 5B. Some of the steps of FIGS. 5A, 5B are indicated at corresponding positions in the data flow diagram of FIG. 6. The system will be assumed to be initially in a condition in which video data that are to be edited have been obtained from the scanner 15 or one of the auxiliary storage devices, have been subjected to any necessary data compression or expansion processing by the data compression/expansion section 19, then subjected to any necessary enlargement or contraction processing by the enlargement/contraction/rotation section 20 (e.g. such that the data will fill the original picture data memory area 101), then stored in the original picture data memory area 101 as the original picture data 100. Thereafter, in step ST1, the system waits to receive any editing processing command from the user. When a command is received, then in step ST2 a decision is made as to whether or not this is a command designating that a new cut-out region is to be established and designating the position (and dimensions) of the cut-out region. If the editing command is not to establish a cut-out region, then a decision is made as to whether or not the command is for executing scrolling (by a specific amount in a specified direction). If the command is not a "scroll" command, then a decision is made as to whether or not the command specifies that picture editing processing is to be terminated. If not, i.e. if some editing processing other than establishment of a new cut-out region or scrolling is to be executed (such as display enlargement or contraction), then that other editing processing is executed (step ST5), and operation returns to step ST1.

If it is found in step ST2 that the input command is to establish a new cut-out region, then a step ST10 is executed, in which the main CPU 6 (more specifically, the program under which the main CPU 6 operates) transfers the contents of that command via the inter-CPU interface section 22 to the sub CPU 10. The sub CPU 10 (i.e. the program under which the sub CPU 10 operates) then calculates from the position information of the new cut-out region within the display region, as specified by the user (e.g. the coordinates $da_x$, $da_y$ and horizontal and vertical dimensions $da_w$, $da_h$), the corresponding position information for that cut-out region with respect to the original picture data memory area 101. In this example, the sub CPU 10 calculates position information with respect to the original picture data memory area 101 consisting of coordinates ($da'_x$, $da'_y$) and the horizontal and vertical dimensions ($da'_w$, $da'_h$). That calculation is based upon:

(a) the position information for the cut-out region that has been specified by the user with respect to the display picture, i.e. with respect to the display data memory area 102, (b) the known degree of enlargement or contraction that has been applied to the data of the selected data region A' within the original picture data memory area 101 to obtain the corresponding data A within the display data memory area 102, and (c) the known position of the selected data region A'

That information specifying the position of the new cut-out region within the original picture data memory area 101 in the original picture data 100, and the information specifying the cut-out region position with respect to the display data memory area 102, is then stored in the position management table 104 (step ST11).

The cut-out region data are then copied into the cut-out region memory area 103, and the replacement data are written into the cut-out region in the original picture data 100 (step ST12).

The selected data region (A), in which the cut-out region now has the replacement data written therein, is now copied into the display data memory area 102 (step ST13), after applying the requisite degree of enlargement or contraction processing. The user can thereby see the effect of the cut-out command which he has inputted to the video editing apparatus.

Operation then returns to step ST1. If the user then successively specifies the cut-out regions "b" and "c", the above sequence of operations will be repeated for each of these regions, as described for the cut-out region "a".

The operation in the case of a "scroll" command being supplied, i.e. a "yes" decision in step ST3 is as follows. As stated above, it will be assumed that the user has previously specified that the cut-out region data which have been stored in the cut-out region memory area 103 are to be restored to their original positions, within the display picture (i.e. appearing in place of the replacement data). Firstly, the contents of the scroll command are transferred by the main CPU 6 to the sub CPU 10, which calculates from the scroll amount (e.g. the amount $h_w$) and direction with respect to the display (i.e. with respect to the display data memory area 102) the corresponding scroll amount and direction with respect to the original picture data 100 in the original picture data memory area 101 (step ST6). Based on that calculated scroll amount and direction, and on the known position of the selected data region A' within the original picture data 100, the sub CPU 10 calculates the position of a corresponding new selected data region B' within the original picture data 100, which is to be transferred for display in place of the selected data region A', and stores the position information for the new selected data region B' (step ST7). The same degree of enlargement or contraction is then applied to the data of selected data region B' which was applied to selected data region A', and the resultant data are copied into the display data memory area 102, as the display data B shown in FIG. 6 (step ST8).

Next, a decision is made as to whether or not there are any cut-out regions (ST9). If not, processing returns to ST1. If there is at least one cut-out region, then the processing sequence designated by numeral 300 in FIG. 5A and shown in FIG. 5B is executed. Firstly, a first one of the cut-out regions is examined to judge whether or not all or part of the cut-out region is positioned within the new selected data region B' in the original picture data memory area 101 (step ST15). This judgement is made through calculations based on the fixed fixed position information for the cut-out region with respect to the original picture data memory area 101 which is stored in the position management table 104 (e.g. the values $da'_x$, $da'_y$, $da'_w$, $da'_h$ in the case of the cut-out region "a"), and upon the aforementioned position information for the new selected data region B' with respect to the original picture data memory area 101. If no cut-out region is positioned partly or completely within the selected data region B', then a decision is made as to whether or not all of the cut-out regions have been judged in that way (step ST16).

If all or part of a cut-out region is found to be within the new selected data region B' in ST15, then the position information for that cut-out region with respect to the selected data region B' (i.e. position coordinates and vertical and horizontal dimensions, as described above) is calculated for the cut-out region or for the part of the cut-out region that is within the selected data region B'. Based on that, the corresponding position information for the cut-out region within the selected data region B of the display data memory area 102 is calculated, i.e. based on the degree of display enlargement or contraction that is to be applied to the selected data region B' before copying into the display data memory area 102, and the position information stored in the position management table 104 (step ST17). That position information is then written into the position management table 104, to replace the previous position information. For example in the case of the cut-out region "a", updated values for the coordinates $da_x$, $da_y$ and horizontal and vertical dimensions $da_w$, $da_h$ will be stored (step ST18).

The cut-out region data are then read out from the cut-out region data memory area 103, subjected to the same degree of enlargement or contraction that was applied to the selected data region B' from the original picture data memory area 101, then copied into the display data memory area 102 (ST19). Thus for example the cut-out region "a" will be inserted into the correct relative position within the display data memory area 102, and so will appear in the display picture in the correct position with respect to the rest of that picture, after leftward scrolling by the amount $h_w$.

Next, a decision is made as to whether or not all of the cut-out regions have been examined (step ST20), and if not, operation returns to step ST14, and the sequence of operations described above is repeated. If it is found in step ST20 that all of the cut-out regions have been processed, operation returns to step ST1.

Figure 6:
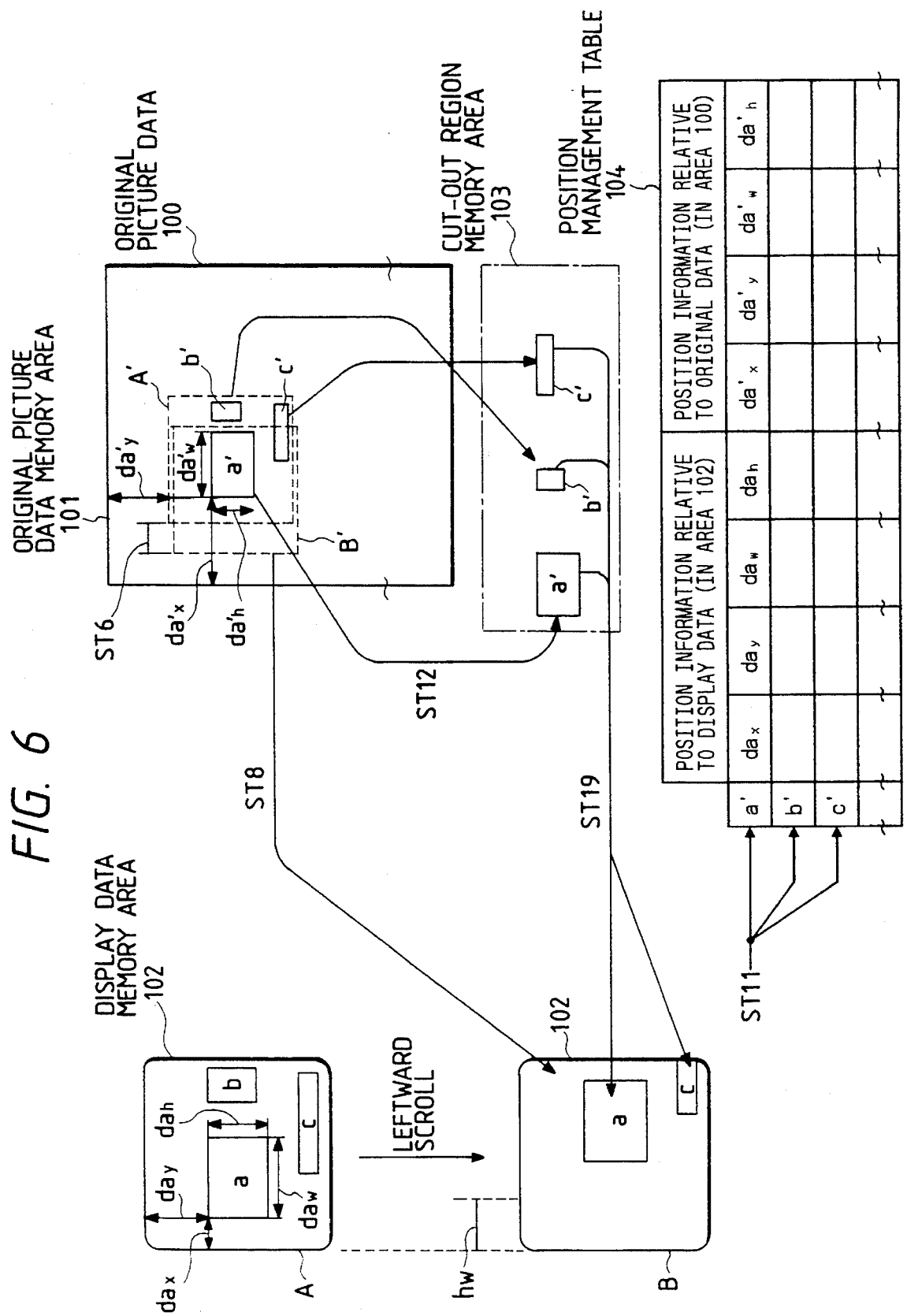
FIG. 6 is a data flow diagram of the first embodiment.

If it is found that only a part of a cut-out region remains within the new display region, e.g. as for the cut-out region "c" in FIG. 6, then there will be a corresponding change in the dimensions information of the position information with respect to the display data memory area 102 that is stored in the position management table 104. For example in FIG. 6, the updated value for the horizontal dimension $dc_w$ for the cut-out region "c" that is calculated in step ST18 and then stored in the position management table 104 after scrolling will be smaller than the previous value. In the case of the cut-out region "b", it will be judged in step ST15 that the cut-out region is not within the new selected data region B'.

The above description has been given for the case of scrolling. However it will be apparent that the apparatus can provide similar results in the case of display enlargement or contraction, i.e. processing to effectively "zoom in" or "zoom out" the contents of the displayed picture. In such a case, instead of shifting the selected selected data region A' within the original picture data 100, a data region within the original picture data 100 is selected which is coaxial with the data region A' and is larger than or smaller than that region by the required amount. The amount of change in the dimensions of the selected data region in the original picture data 100 is calculated by the sub CPU 10 based on the amount of display enlargement or contraction that is specified by the user. The selected data region in the original picture data 100 is then copied into the display data memory area 102, after applying a sufficient degree of enlargement or contraction processing to ensure that the resultant data will fill the display data memory area 102. A similar sequence of processing steps to that of steps ST9, ST14 to ST20 in FIG. 5B is then executed, to find if there are any cut-out regions which are partially or completely within the new data region, and if so, to derive updated position information for each cut-out region with respect to the display data memory area 102, to be stored in the position management table 104. For example in the example of FIG. 6, if the contents of the display data memory area 102 are enlarged or contracted, then each of the position information values $da_x$, $da_y$ $da_w$, and $da_h$ for the cut-out region "a" will be changed as a result.

The updated position information for each cut-out region with respect to the display data memory area 102 is calculated based on the fixed position information for the cut-out region with respect to the original picture data memory area 101 (stored in the position management table 104) and the amount of change in the dimensions of the new selected data region within the original picture data memory area 101 (determined by the degree of enlargement or contraction of the display picture which has been specified by the user). When the position information with respect to the display data memory area 102 has thus been derived for a cut-out region, the cut-out region data are then operated on in the enlargement/contraction/rotation section 20 by the same degree of enlargement or contraction that has been applied to the new selected data region from the original picture data 100, and the resultant cut-out region data are copied into the display data memory area 102 at the calculated position. As a result, the cut-out region will be enlarged or contracted by the same amount as the rest of the displayed picture produced by the display unit 1, and will also be in the correct relative position within the displayed picture.

It can thus be understood that the processing sequence for the case of enlargement or contraction being applied to the display picture is very similar to that for the case of scrolling, described hereinabove. For that reason, no detailed processing flow diagram for the case of display enlargement or contraction is provided.

It can be understood from the above description that with the first embodiment described above, when one or more cut-out regions is created and replacement data are inserted into each cut-out region in the display picture, the displayed cut-out regions will move as an integral part of the display picture when operations such as scrolling or display enlargement or contraction are performed. Furthermore since the necessary processing is executed by operating on data held in memory areas (101, 103, 104) within a high-speed RAM (the common memory 21), a high speed of scrolling can be achieved.

Figure 8:
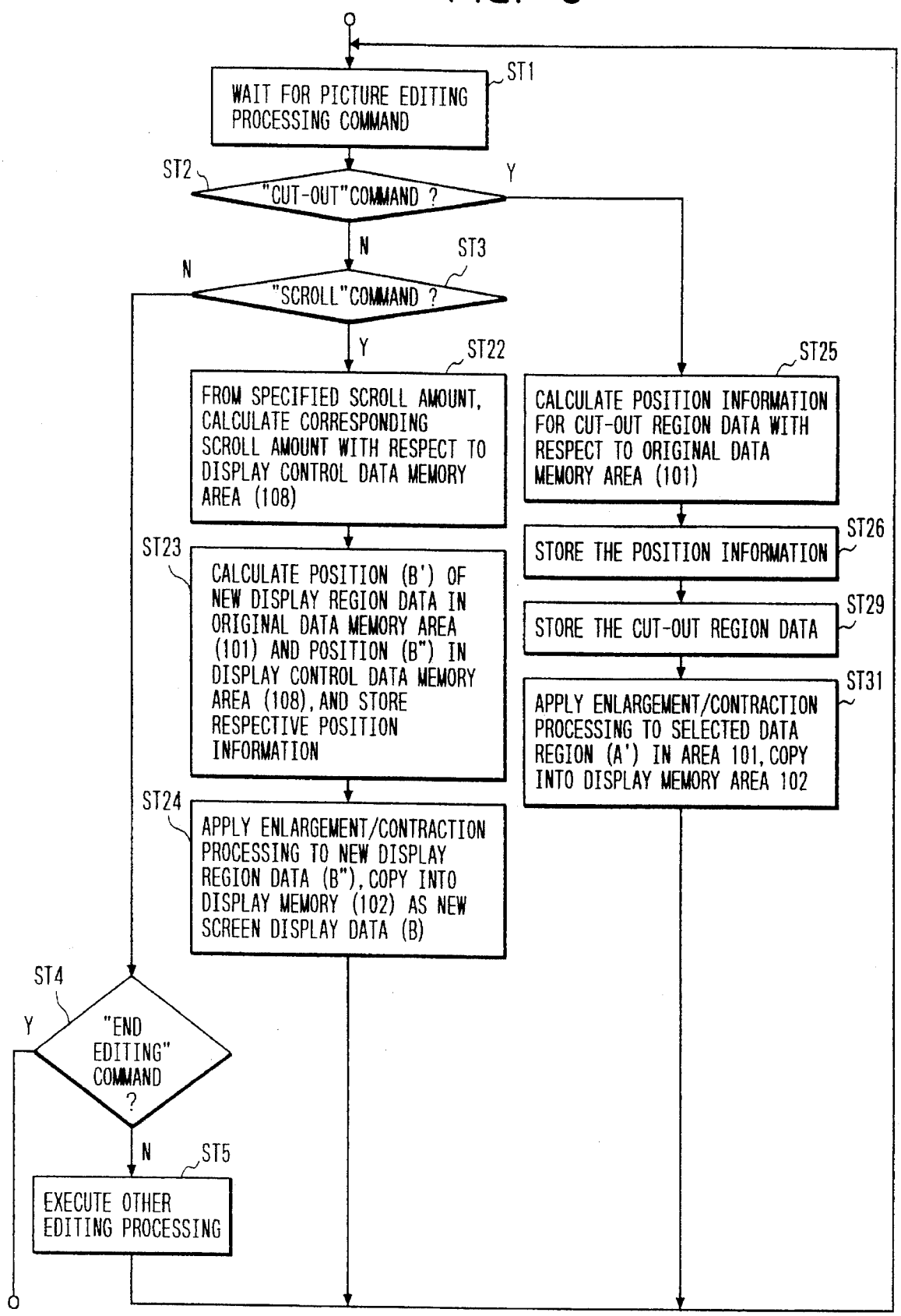
FIG. 8 is a processing flow diagram of a second embodiment.
Figure 9:
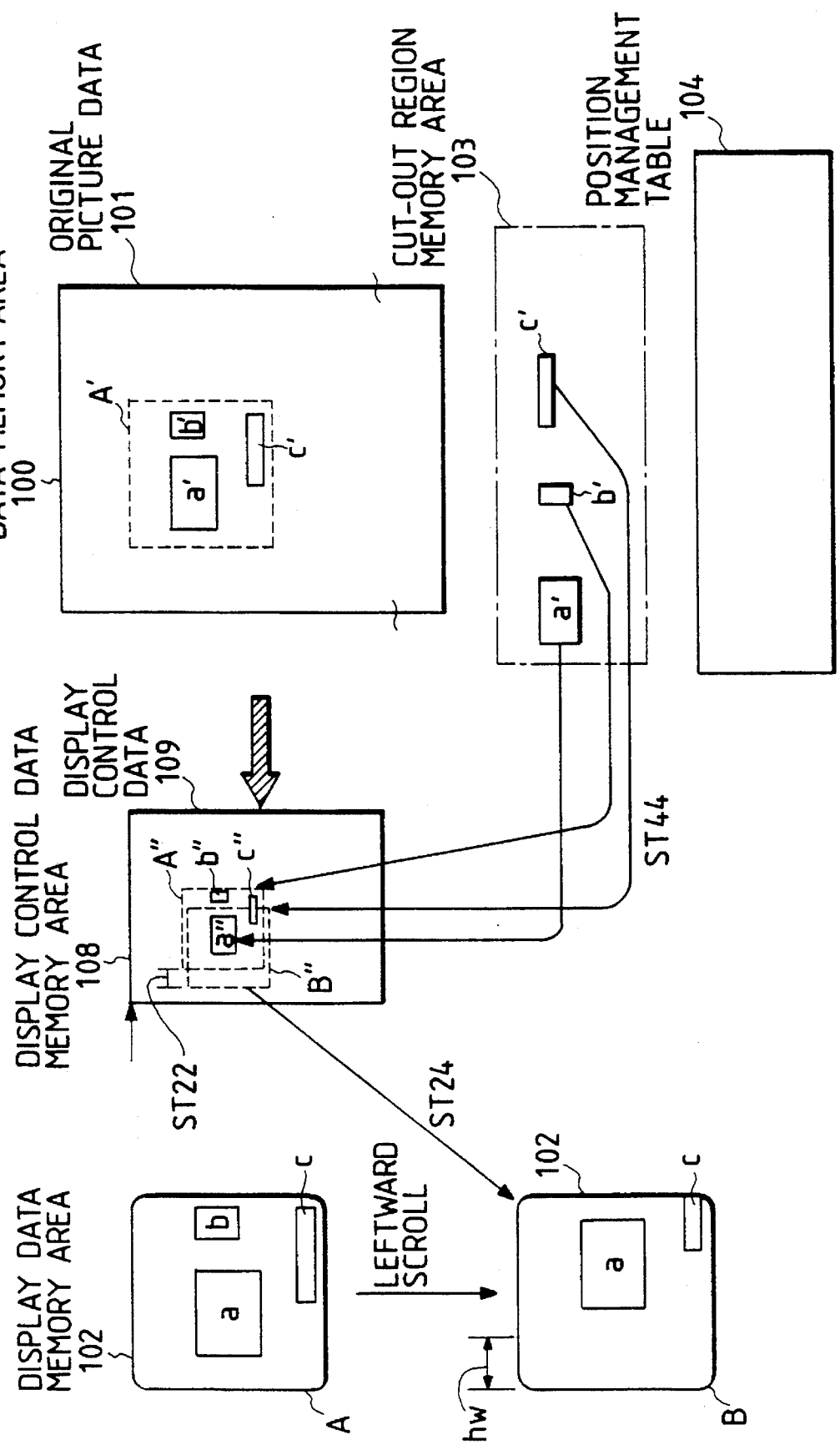
FIG. 9 is a data flow diagram of the second embodiment.

With the first embodiment described above, it is necessary to recalculate position information for each of the cut-out regions with respect to the display data memory area 102, each time that a scrolling command or a display enlargement or contraction command is processed. A second embodiment of the invention will be described, whereby such position information calculations are eliminated. The embodiment will be described referring to the processing flow diagram of FIG. 8 and the corresponding data flow diagram of FIG. 9. In FIG. 9 the memory areas 100, 102, and 103 respectively correspond to the identically numbered memory regions in FIG. 6 of the first embodiment described above. However in this embodiment, a display control data memory area 108 is also reserved in the common memory 21, for storing a combination of original picture data and cut-out region data, referred to in the following as the display control data 109. It will be assumed in the following that, in order to minimize the amount of memory capacity required to form the display control data memory area 108, the size of the memory area 108 (which has identical proportions to the original picture data 100) is made smaller than the original picture data 100.

The operation is as follows. The steps ST1 to ST5 in FIG. 8 are identical to the correspondingly designated steps in the processing flow diagram of FIG. 5A described above, so that further description will be omitted. It will be assumed that initially (i.e. prior to forming any cut-out regions in the original picture data memory area 101), the entire original data 101 in the original picture data 100 have been copied into the display control data memory area 108, after having been subjected to contraction processing by a sufficient amount to ensure that the data will fill the display control data memory area 108. It will also be assumed that the selected data region A' in the original picture data memory area 101 is to be displayed, so that the corresponding selected data region A" in the display control data 109 has been selected to be read out from the display control data 109 and enlarged or contracted to a sufficient degree to fill the display data memory area 102 and so be displayed by the display unit 1 as the display data A, and also that position information for the selected data region A" with respect to the display control data memory area 108 has been stored in the position management table 104. If now a picture editing processing command is supplied to the system, and it is judged in step ST2 that a command to produce a cut-out region has been supplied, then as for the first embodiment the main CPU 6 transfers the command contents (which include position information with respect to the display data memory area 102) to the sub CPU 10, which calculates position information for that cut-out region with respect to the original picture data 100, for example position information for the data region a' in FIG. 9 (step ST25). That position information is then stored in the position management table 104 (step ST26). The out-out region data in the original picture data 100 are then copied into the out-out region data memory area 103, then the replacement data for that cut-out region are written into the original picture data 100 (step ST29).

The selected data region within the original picture data memory area 101 in the original picture data 100 (e.g. the selected data region A' in FIG. 9), with the replacement data inserted into the cut-out region, is then copied into the display data memory area 102, after being subjected to the same degree of enlargement or contraction as before (step ST31). Thus for example the display data A in FIG. 9 will now contain the replacement data data for the cut-out region "a", inserted at the specified position.

If it is found in this condition, that a scrolling command has been generated, then the main CPU 6 transfers the command contents, which include the scroll amount with respect to the display data memory area 102 (e.g. the amount $h_w$ in FIG. 9) to the sub CPU 10, which then calculates the corresponding scroll amount with respect to the display control data memory area 108 and the corresponding scroll amount with respect to the original picture data 100 (step ST22). Based on these scroll amounts, respective new selected data regions are defined in the original picture data memory area 101 and in the display control data memory area 108 respectively (step ST23), and the position information for these are stored in the position management table 104. The new selected data region in the original picture data 100 is then copied into the display data memory area 102, so that the scrolled display picture will contain the cut-out regions with replacement data inserted therein, in the correct relative positions within the picture. To simplify the diagram, the latter step is not shown in FIG. 8, in which it is assumed that the user has specified that in the display picture that is produced after scrolling is completed, the original data contents of each cut-out region are to be restored. In that case instead of copying the selected data region from the original picture data 100 into the display data memory area 102, the new selected data region (B") in the display control data memory area 108 is then copied into the display data memory area 102 (after applying the requisite degree of enlargement or contraction processing to the data, to fill the display data memory area 102), to thereby form the display picture ST24).

Since the display control data memory area 108 only contains the original picture data, the display picture that is thereby obtained will have the original contents of the cut-out regions restored. At any time of course, the user can input a command to produce the display picture in which the cut-out regions appear (i.e. with the replacement therein), in which case the selected data region (B') from the original picture data 100 will be copied into the display data memory area 102, to be displayed as described above.

It can thus be understood that this embodiment provides similar results to those obtainable with the first embodiment described above. However with the second embodiment, it becomes unnecessary to calculate updated position information for the cut-out regions and store the updated position information in the position management table 104, after each scrolling operation. However it is preferable to store position information for each cut-out region with respect to the original picture data 100, since if a cut-out region is subsequently to be permanently restored, it will be necessary to read out the the corresponding data from the cut-out region memory area 103 and copy the data back into the cut-out region in the original picture data 100.

It will also be understood that although the operation of the second embodiment has been described in the above for the case of scrolling, the operation in the case of executing display enlargement or contraction processing will be very similar. In that case, assuming that display expansion is to be produced, and the user specifies that the contents of any cut-out region (or part of a cut-out region) appearing in the display picture after the expansion are to be restored to their original state, then a new data region within the display control data memory area 108 is selected which is coaxial with the selected data region A" and is smaller than that region by an amount determined by the degree of expansion that is to be achieved, and the selected new data region data are then copied into the display data memory area 102 after applying the appropriate degree of enlargement or contraction to the data such that the display data memory area 102 will be filled. Thus the operation is similar to that described for the case of scrolling.

It can thus be understood that the second embodiment provides the advantage that it becomes unnecessary to perform position information calculations for each of the out-out regions, when a scrolling command or display enlargement or contraction command is processed, and the original data of the cut-out regions are to be restored. However it is necessary to continuously reserve a display control data memory area 108 within the common memory 21, so that additional memory capacity is required in the common memory 21.

Figure 10A:
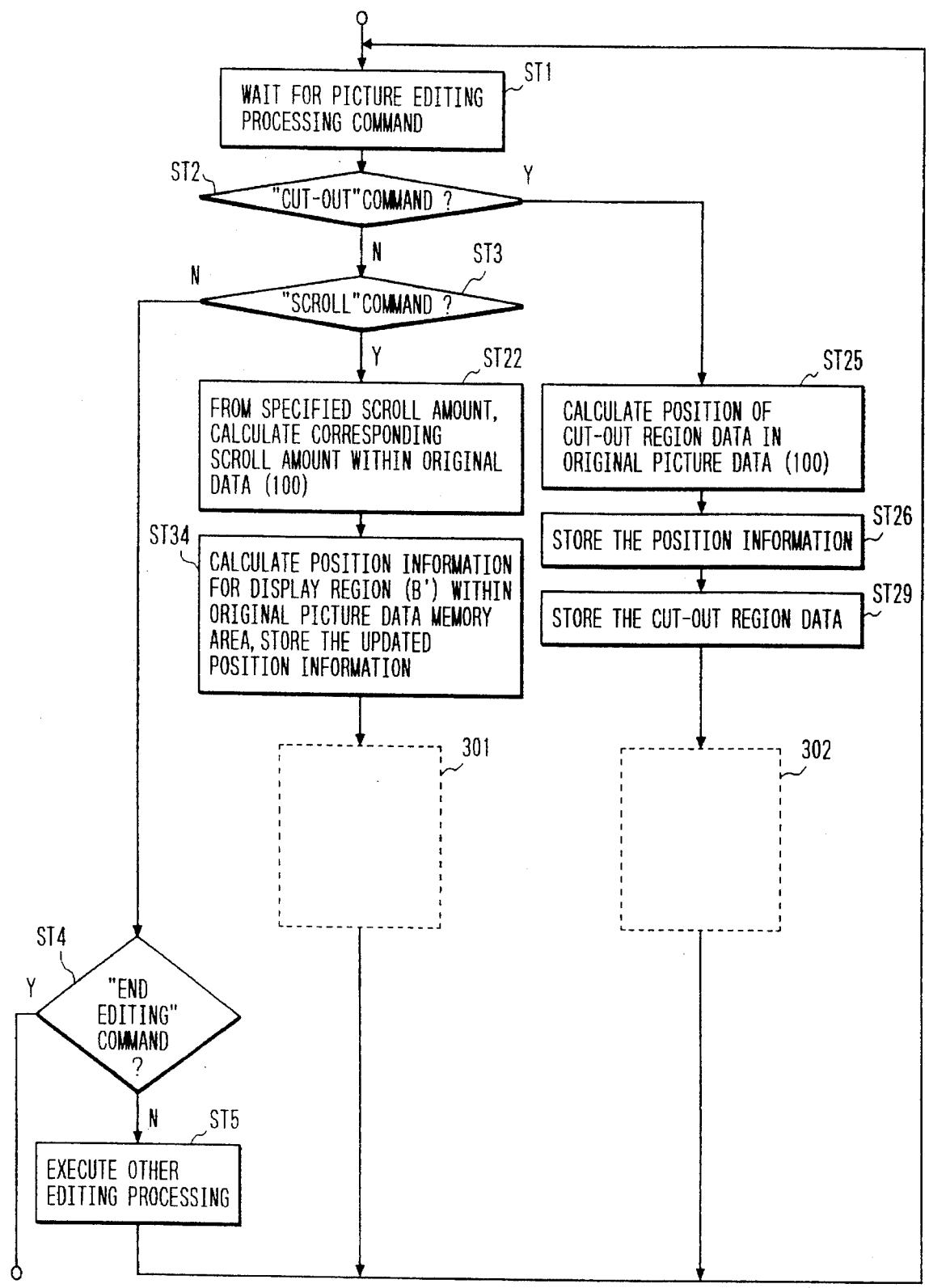
FIGS. 10A, 10B constitute a processing flow diagram of a third embodiment, which is a modification of the second embodiment.
Figure 10B:
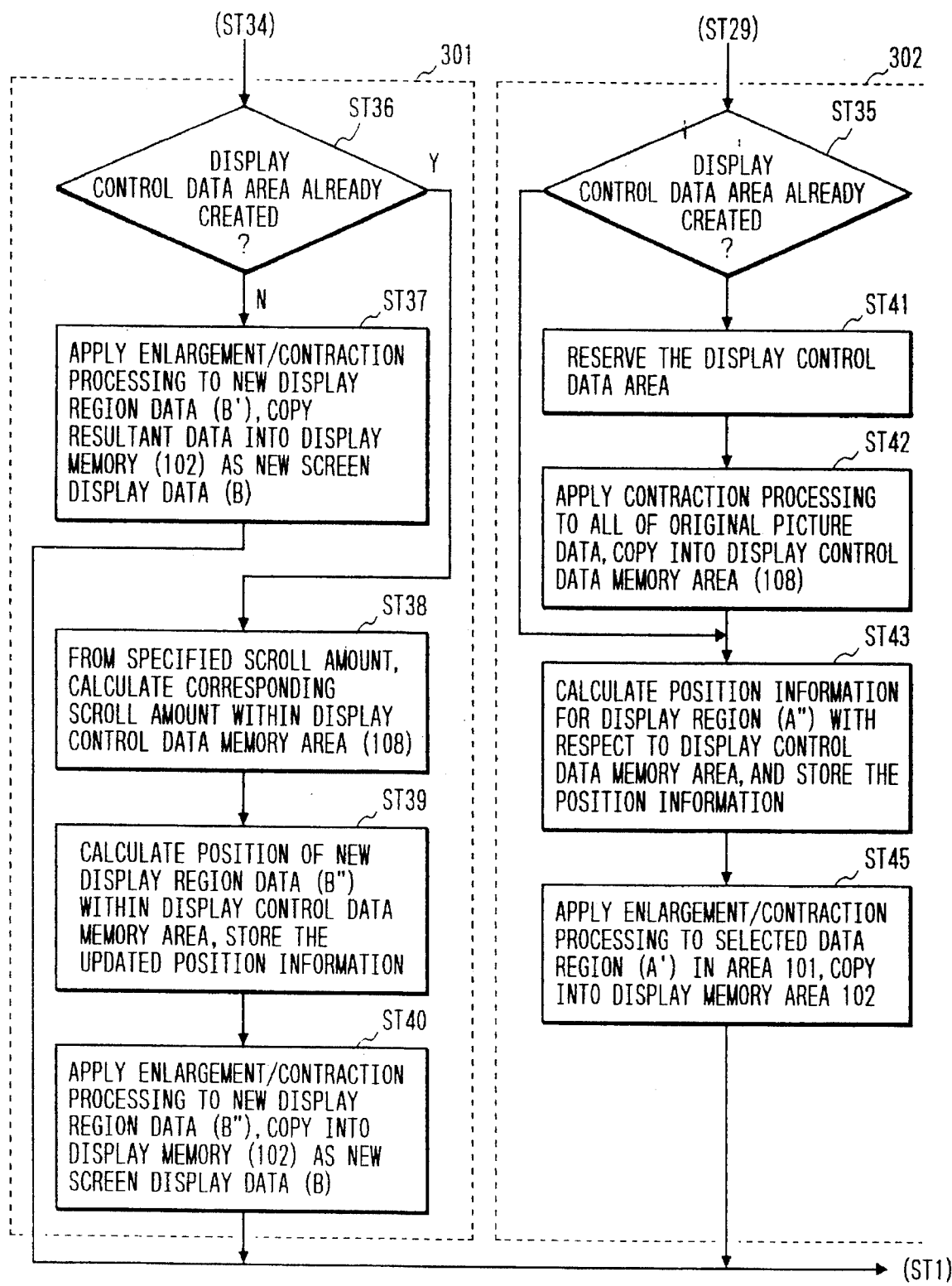

A third embodiment of the invention will be described, which is a modification of the second embodiment described above, and in which a display control data memory area 108 is only reserved within the common memory 21 when at least one cut-out region is to be displayed. Thus, the memory capacity required for the display control data memory area 108 can be used for other purposes, so long as the user does not designate any cut-out regions. This operation will be described referring to FIG. 9 and to the processing flow diagram constituted by FIGS. 10A, 10B. If it is found in step ST2 that a command to produce a cut-out region has been supplied, then position information for that cut-out region with respect to the original picture data 100 in the original picture data memory area 101 is calculated, and stored (steps ST25, ST26). The cut-out region data are then stored in the cut-out region data memory area 103 (step ST29). A sequence of steps designated by numeral 302 in FIG. 10A and shown in FIG. 10B are then executed. Firstly, a decision is made as to whether or not a display control data memory area 108 has already been reserved in the common memory 21, i.e. as to whether or not a cut-out region already exists (step ST35). If not, the display control data memory area 108 is established (step ST41), then all of the original picture data memory area 101 are subjected to contraction processing by the appropriate amount and copied into the display control data memory area 108 (step ST42). The position information for the selected data region (A") with respect to the display control data memory area 108 is then calculated and stored in the position management table 104 (step ST43). The selected data region (A') in the original picture data 100 is then subjected to the necessary degree of enlargement or contraction processing, and copied into the display data memory area 102, i.e. as the display data A in the example of FIG. 9.

Returning to FIG. 10A, if it is found in step ST3 that a scrolling command has been supplied then in step ST22, as described for the preceding embodiments, the corresponding scroll amount with respect to the original data in the original picture data memory area 101 is calculated, based on the scroll amount that is specified in the command (i.e. an amount specified in relation to the display picture represented by the contents of the display data memory area 102). In the next step ST34, the position information is calculated for the new region B' that is to be selected from the original picture data 100 as a result of the scrolling, and the position information is stored in the position management table 104. A sequence of steps designated by numeral 301 in FIG. 10A and shown in FIG. 10B are then executed. Firstly, a decision is made as to whether or not a display control data memory area 108 has already been reserved in the common memory 21, i.e. if at least one cut-out region has been created since the start of display editing of the original picture data memory area 101 (step ST36) and the original cut-out region contents are to be restored in the display picture. If the decision is NO, then not, then the new selected data region B' in the original picture data 100 is copied into the display data memory area 102, after enlargement or contraction processing. Operation then returns to step ST1. If it is found in step ST36 that a display control data memory area 108 has already been reserved in the common memory 21 and that the original cut-out region contents are to be restored in the display picture, then the corresponding scroll amount with respect to the display control data memory area 108 is calculated (step ST38), then based on that scroll amount, the position information for the corresponding new selected data region (i.e. B" in the example of FIG. 9) within the display control data memory area 108 is calculated (step ST39). The contents of that region B" are then subjected to the appropriate degree of enlargement or contraction processing to fill the display data memory area 102, and copied into the display data memory area 102 as the new screen display data B (step ST40). Since the display control data memory area 108 contains the original picture data in unchanged form, i.e. with no insertion data set into any of the cut-out regions, the desired display picture is obtained. Operation then returns to step ST1.

It will be understood that various other operations can be executed by each of the above embodiments although not described. For example if required, the cut-out region data can be copied back into the original picture data memory area 101 at any time, at the original positions or at any arbitrary positions.

Furthermore, various modifications to each of the above embodiments could be envisaged. For example, it would be possible to modify the first embodiment by providing an additional cut-out region memory area similar to the area 103. In that case, when cut-out region data are to be restored to the display picture, the replacement data for the cut-out region can be temporarily stored by being copied into the second cut-out region memory area, then the cut-out region data can be copied from the cut-out region memory area 103 into their original position in the original picture memory area 101, and the selected data region within the original picture data memory area 101 then copied into the display data memory area 102. In that case, as for the second and third embodiments above, scrolling or display enlargement or contraction can be executed without the need to copy each of the cut-out regions into the display data memory area 102 after each scrolling or enlargement or contraction step. The operation of such an embodiment will be obvious from the description of the preceding embodiments, so that detailed description will be omitted.

In the above description, the operation in the case of scrolling, enlargement or contraction of the display picture has been described for the embodiments. However it will be apparent that similar results can be obtained for the case of rotation of the display picture, for the same basic reasons, i.e. due to the fact that positions of cut-out regions are fixedly defined within the original picture data memory area, and a portion of the data in that memory area is selected to be displayed.

Figure 1:
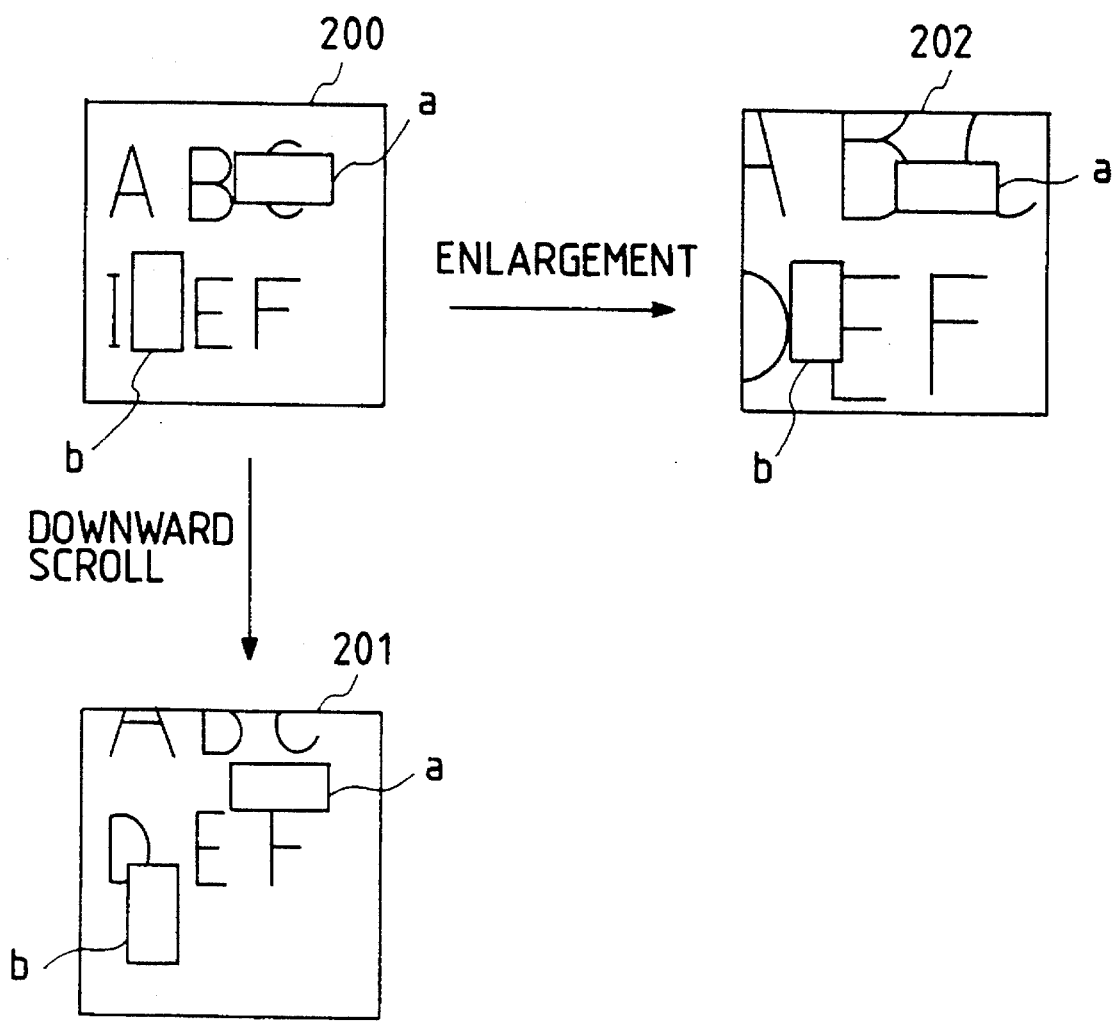
FIG. 1 illustrates changes resulting from display scrolling and enlargement or contraction, in a display picture which includes cut-out regions, for illustrating a problem of a prior art type of video editing apparatus.
Figure 2:
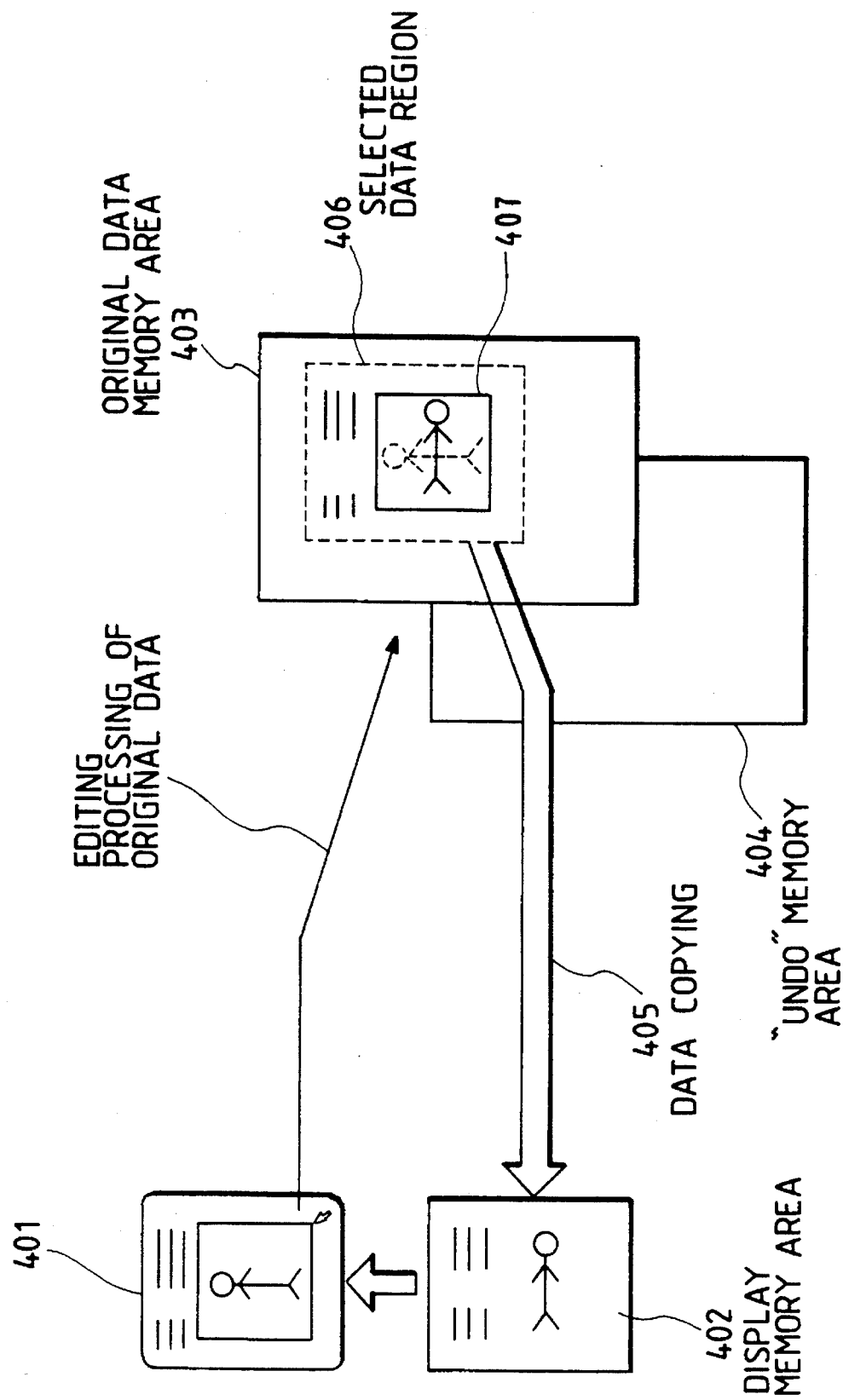
FIG. 2 is a simple data flow diagram to illustrate another problem of a prior art type of video editing apparatus.
Figure 3:
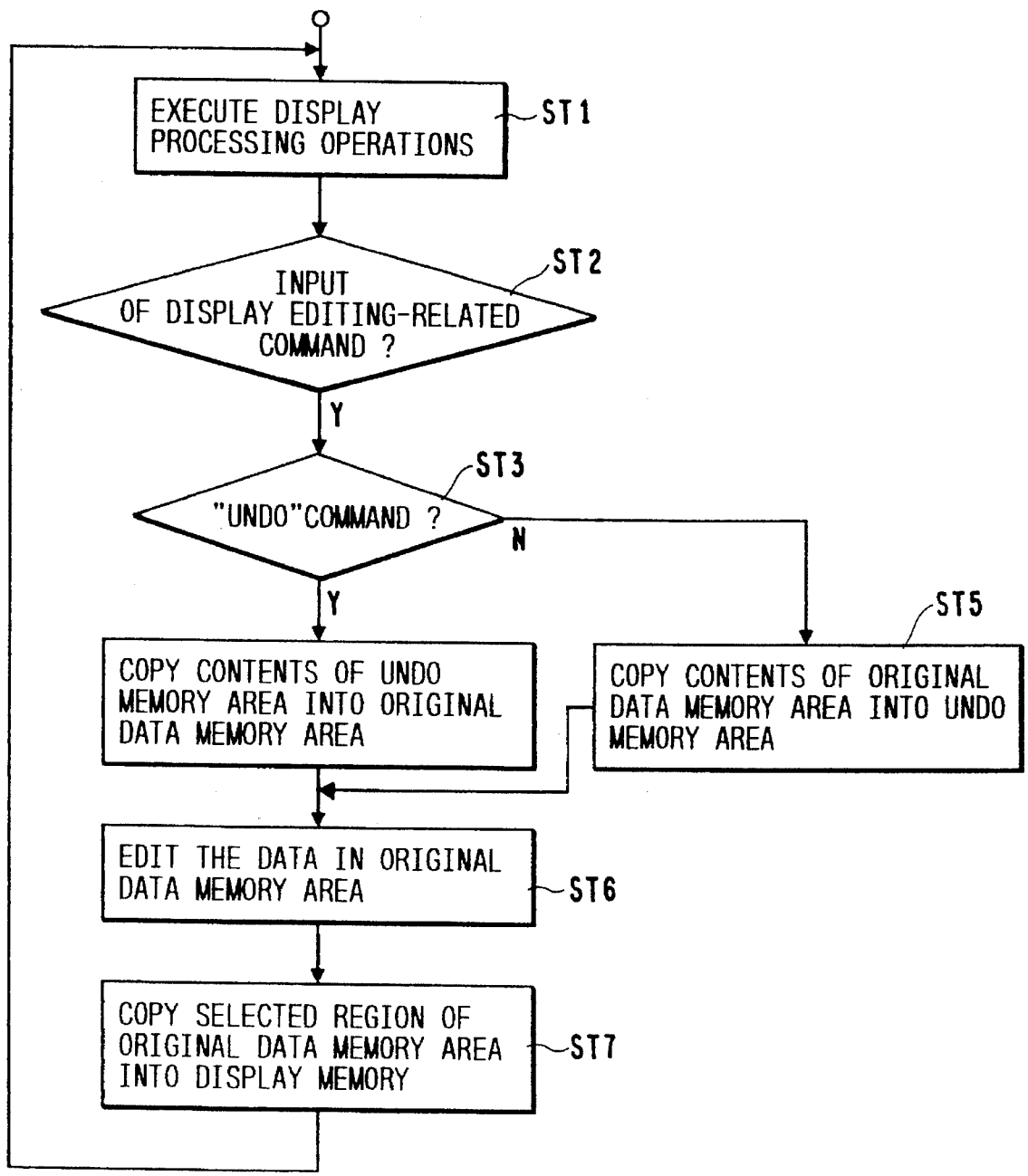
FIG. 3 is a processing flow diagram for a prior art type of video editing apparatus, corresponding to the data flow diagram of FIG. 2.

A fourth embodiment of the present invention will be described, referring to the simple data flow diagram of FIG. 11 and the corresponding processing flow diagram of FIG. 12. The objective of this embodiment is to overcome the disadvantages of a prior art video editing apparatus in which provision is made for cancelling the affects of the most recently inputted display editing command, as described hereinabove referring to FIG. 2. The system configuration of this embodiment is the same as for the preceding embodiments, shown in FIG. 4 and described hereinabove. In FIG. 11, 102a conceptually indicates a display picture that is being produced by the display unit 1 and the generation of display editing commands by the user (through the mouse 3 and keyboard 4) while pointing to regions within the display picture. Numeral 141 denotes a memory area within the common memory 21, in which are reserved two fixed-size memory areas 142 and 143, each of identical size, which will be assumed to be identical to the size of the display data memory area 102. The display processing memory area 142 is used for display editing operations by the sub CPU 10, i.e. operations on the picture contents represented by the data within the display processing memory area 142, such as rotation of regions, deletion or insertion of lines, etc., in the same way in which the original picture data memory area 101 is used in the first embodiment described above. This embodiment thereby differs from the first embodiment described above, in which all such display editing operations are executed using the original picture data memory area 101. At the start of display editing, the contents of a selected region A' of the data in the original picture data memory area 101 are copied into the display processing memory area 142, after applying the required degree of display enlargement or contraction processing such that the selected data region will fill the display processing memory area 142, and the contents of the display processing memory area 142 are then copied into the display data memory area 102. Thereafter, each time that scrolling is executed or a display enlargement or contraction operation is executed, (so that a new region of data within the original picture data memory area 101 is selected to be transferred to be displayed, as described hereinabove for the preceding embodiments) the contents of the newly selected data region within the original picture data memory area 101 are copied into the display processing memory area 142, after applying a new degree of enlargement or contraction processing if necessary, and then copied into the display data memory area 102. Thus the contents of the display processing memory area 142 are continuously displayed by the display unit 1.

Each time that a display editing command is inputted by the user and executed with respect to the contents of the display processing memory area 142, the entire contents of the display processing memory area 142 (prior to that command being executed) are first copied into the "undo" memory area 143. The command is then executed with respect to the display processing memory area 142, i.e. producing some change in the contents of the display processing memory area 142. Thereafter, the contents of a corresponding command with respect to the original picture data memory area 101, referred to in the following as an original data editing command, are calculated (i.e. by altering the position coordinate values of the command that has been inputted by the user, in accordance with the position of the selected data region A' within the original picture data memory area 101 and in accordance with the degree of display enlargement or contraction processing that is being applied to the selected data region A' before copying the data into the display processing memory area 142, as described hereinabove for the preceding embodiments). The command contents thus obtained are then stored in a editing command register 132, but are not executed at that time. Thus, the display picture is altered in accordance with the editing command that has been inputted by the user, however the data in the original picture data memory area 101 have not yet been altered in accordance with that command. The original data editing command held in the editing command register 132 is not executed until a succeeding display editing command is inputted by the user, and then is deleted from the register. If the user inputs an "undo" command prior to that succeeding display editing command, then the contents of the editing command register 132 are deleted, while in addition the contents of the "undo" memory area 143 are copied into the display processing memory area 142 and then displayed.

Taking the very simple example shown in FIG. 11, it is assumed that the user designates an area 104 within the display picture, e.g. by pointing with the mouse 3, then inputs a display editing command which specifies that the contents of the designated area are to be rotated by 90°. As a result, the contents of the "undo" memory area 143 become as shown, and the contents of the display processing memory area 142 are altered in accordance with the display editing command. However at this stage, the contents of the original picture data memory area 101 are left unchanged, although a corresponding display editing command with respect to the original picture data memory area 101 is set into the editing command register 132 (i.e. a command in which position information for the specified region 104 in the display picture has been changed to position information for the corresponding region 105 within the original picture data memory area 101). If the user then inputs some other display editing command, then the contents of the original picture data memory area 101 are altered in accordance with the contents of the command held in the editing command register 132, so that the region 105 is now altered as specified by the user. The command that was stored in the editing command register 132 is then deleted from that register.

However if after inputting the first-mentioned display editing command the user wishes to cancel the command, by inputting an "undo" command, then the contents of the "undo" memory area 143 are copied back into the display processing memory area 142, and the contents of the display processing memory area 142 then copied into the display data memory area 102, so that the preceding display contents shown as region 104 are restored.

Figure 12:
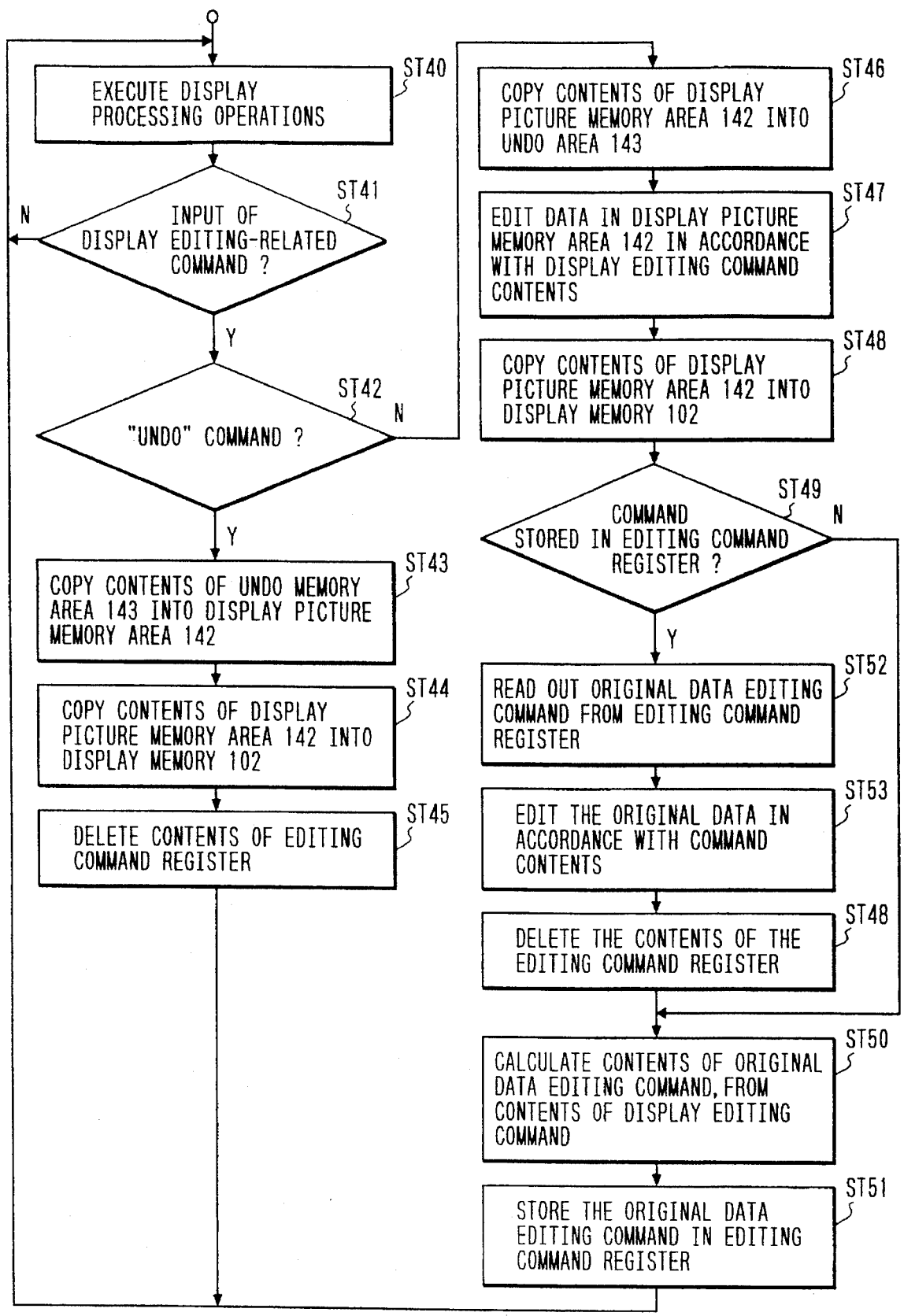
FIG. 12 is a processing flow diagram for the fourth embodiment.

FIG. 12 is a processing flow diagram for this embodiment. For simplicity, the operations executed in the case of a scrolling command or a display enlargement or contraction command are omitted. When such a command is processed, so that a different selected data region within the original picture data memory area 101 is specified for display, then that selected data region is copied into the display processing memory area 142 after being subjected to the necessary degree of enlargement or contraction processing such that the selected data will fill the display processing memory area 142. The contents of the display processing memory area 142 are then copied into the display data memory area 102.

In step ST40 of FIG. 12, the user executes various display processing operations, such as scrolling or enlargement or contraction of the displayed data, cursor movement, etc. If during these operations the user executes a display editing-related command, then that is detected in step ST41. Here, a "display editing-related" command signifies either a display editing command (i.e. which will produce some change in the contents of the display picture, such as deletion of any part of the picture contents, insertion of a new portion, "cutting-out" and shifting a portion, etc.), or an "undo" command.

If it is found that the input command is not an "undo" command in (step ST42), then this signifies that the command must be a display editing command. In that case, the contents of the display processing memory area 142 are copied into the "undo" memory area 143 (step ST46), then the contents of the display processing memory area 142 are edited in accordance with the contents of the display editing command (step ST47). The contents of the display processing memory area 142 are copied into the display data memory area 102, to be displayed (step ST48).

A judgement is then made as to whether there is a command stored in the editing command register 132, i.e. an original data editing command, specified with respect to the original picture data memory area 101 (step ST49). For example at the start of display editing, when executing the first display editing command, the editing command register 132 will be empty. In that case, the contents of an original data editing command corresponding to the display editing command executed in step ST47 are then calculated (step ST50), e.g. by altering the values of position coordinates with respect to the display data memory area 102 and display processing memory area 142 to position coordinates with respect to the original picture data memory area 101. That original data editing command is then stored in the editing command register 132 (step ST51). Operation then returns to step ST40, to wait for the next input of a display editing-related command.

If that next display editing-related command is an "undo" command, then the contents of the "undo" memory area 143 are copied into the display processing memory area 142 (step ST43), then the data in the display processing memory area 142 are copied into the display data memory area 102, to be displayed (step ST44). The contents of the editing command register 132 are then deleted (step ST45).

If that next display editing-related command is not an "undo" command but is a new display editing command, then steps ST46 to ST48 will be executed as described above, to alter the display contents in accordance with the new display editing command contents. However when step ST49 is now executed, it will be found that there is an original data editing command in the editing command register 132, and so operation proceeds to step ST52. The contents of the original data editing command are read out from the editing command register 132 (step ST52) and executed, to accordingly alter the original data in the original picture data memory area 101 (step ST53). That command is then deleted from the editing command register 132, and operation proceeds to step ST50. Contents for a new original data editing command are then calculated, from the contents of the aforementioned new display editing command that was executed in step ST48. The original data editing command is then stored in the editing command register 132, and operation returns to step ST40, to wait for the next input command.

When the user finally terminates display editing, then it will be necessary as a final step for the system to judge whether there is an original data editing command stored in the editing command register 132, and if so, to execute that command (i.e. execute steps ST52, ST53). However for simplicity of description, the steps for performing that operation are omitted from the flow diagram.

What is claimed is:

1. A video editing apparatus comprising:

video display means for displaying a picture;

a first memory area for storing original picture data representing an original picture;

a second memory area for storing display picture data copied from said original picture data of said first memory means, representing a display picture within said original picture, and supplying said display picture data to be displayed by said video display means;

a third memory area for storing cut-out data representing previously extracted cut-out picture regions of said original picture;

table memory means for storing, for each of said previously extracted cut-out picture regions, first position information specifying a position of said previously extracted cut-out picture region with respect to said first memory area, and second position information specifying a position of said each previously extracted cut-out picture region with respect to said second memory area;

control means responsive to a cut-out command which specifies said second position information for a new cut-out picture region; for:

writing said specified second position information into said table memory means, calculating said first position information for said new cut-out picture region with respect to said first memory area and writing said first position information into a fourth memory means, copying into said third memory area, from said first memory area, new cut-out data representing said new cut-out picture region, and replacing said new cut-out data within said first memory area with arbitrarily determined replacement data; and control means responsive to a scroll command specifying scrolling of said display picture by a required scroll amount and direction, in a condition in which at least one previously extracted cut-out picture region is to be restored within said display picture, for:

scrolling through said picture data in said first memory area in accordance with said scroll amount and direction, to locate updated display picture data, then copying the updated display picture data into said second memory area, executing calculations, using said scrolling amount and direction and said first position information for said previously extracted cut-out picture region, to obtain updated second position information specifying a position of any part of the previously extracted cut-out picture region which lies within said second memory area, and writing said updated second position information into said table memory means, and copying, from said third memory area, cut-out data representing said any part of the previously extracted cut-out picture region, into said second memory area at a position determined by said updated second position information.

2. A video editing apparatus comprising:

video display means for displaying a picture;

a first memory area for storing original picture data representing an original picture;

a second memory area for storing display picture data copied from said original picture data of said first memory means, representing a display picture within said original picture, and supplying said display picture data to be displayed by said video display means;

a third memory area for storing cut-out data representing previously extracted cut-out regions of said original picture;

table memory means for storing, for each of said previously extracted cut-out picture regions, first position information specifying a position of said previously extracted cut-out picture region with respect to said first memory area, and second position information specifying a position of said each previously extracted cut-out picture region with respect to said second memory area;

control means responsive to a cut-out command which specifies said second position information for a new cut-out picture region, for:

writing said specified second position information into said table memory means, calculating said first position information for said new cut-out picture region with respect to said first memory area and writing said first position information into said fourth memory means, copying into said third memory area, from said first memory area, new cut-out data representing said new cut-out picture region, and replacing said new cut-out data within said first memory area with arbitrarily determined replacement data; and control means responsive to a display enlargement or contraction command specifying a required degree of magnification or contraction of the contents of said display picture, in a condition in which at least one previously extracted cut-out picture region is to be restored within said display picture, for:

selecting updated picture data in said first memory area, determined in accordance with said required degree of magnification or contraction, applying magnification or contraction processing to said updated picture data, and copying resultant picture data into said second memory area;

executing calculations, using said specified degree of enlargement or contraction and said first position information for said previously extracted cut-out picture region, to obtain updated second position information for said previously extracted cut-out picture region, and writing said updated second position information into said table memory means, and reading out from said third memory means said cut-out data representing said previously extracted cut-out picture region, applying said enlargement or contraction processing to said cut-out data to obtain data representing a region identical in size to said previously extracted cut-out picture region within said second memory area, and copying said data into said second memory means at a position determined by said updated second position information.

* * * * *